(12) United States Patent
Wang et al.

(10) Patent No.: US 10,260,711 B2
(45) Date of Patent: Apr. 16, 2019

(54) LIGHT CONTROL FILMS AND LIGHTING DEVICES INCLUDING SAME

(71) Applicant: OSRAM SYLVANIA Inc., Wilmington, MA (US)

(72) Inventors: Zhuo Wang, Middleton, MA (US); Bruce Radl, Stow, MA (US)

(73) Assignee: OSRAM SYLVANIA Inc., Wilmington, MA (US)

(*) Notice: Subject to any disclaimer, the term of this patent is extended or adjusted under 35 U.S.C. 154(b) by 0 days.

(21) Appl. No.: 15/314,933

(22) PCT Filed: Jun. 1, 2015

(86) PCT No.: PCT/US2015/033604
§ 371 (c)(1),
(2) Date: Nov. 29, 2016

(87) PCT Pub. No.: WO2015/184456
PCT Pub. Date: Dec. 3, 2015

(65) Prior Publication Data
US 2017/0097448 A1 Apr. 6, 2017

Related U.S. Application Data

(60) Provisional application No. 62/005,946, filed on May 30, 2014, provisional application No. 62/005,963, (Continued)

(51) Int. Cl.
*G02B 5/02* (2006.01)
*F21V 13/04* (2006.01)
(Continued)

(52) U.S. Cl.
CPC ............ *F21V 13/04* (2013.01); *F21S 8/026* (2013.01); *F21V 5/002* (2013.01); *F21V 7/0083* (2013.01);
(Continued)

(58) Field of Classification Search
CPC .. G02B 6/0231; G02B 6/0278; G02B 6/0035; G02B 6/0036; G02B 6/0038; F21V 5/002; F21V 5/08
See application file for complete search history.

(56) References Cited

U.S. PATENT DOCUMENTS 3,721,818 A 3/1973 Stahlhut
3,735,124 A * 5/1973 Stahlhut .................... F21V 5/00
362/333
(Continued)

FOREIGN PATENT DOCUMENTS

| CN | 203 615 147 U | 5/2014 |
|---|---|---|
| DE | 23 57 060 A1 | 5/1974 |
| EP | 2 495 588 A1 | 9/2012 |
| WO | 2010/008101 A1 | 1/2010 |

(Continued)

OTHER PUBLICATIONS

Christoph Baur, International Search Report and Written Opinion of the International Searching Authority for PCT/US2015/033604, dated Nov. 5, 2015, pp. 1-20, European Patent Office, Rijswijk, The Netherlands.

*Primary Examiner* — Zheng Song
(74) *Attorney, Agent, or Firm* — Edward S. Podszus

(57) ABSTRACT

Light control films, and lighting devices including the same, are disclosed. The light control films include a single layer of light transmitting material having a first side and a second side. A plurality of first microstructures are formed in the first side. The first microstructures are configured to receive incident light from a light source and produce an off axis (e.g. batwing) light distribution in a field downstream of the second side of the light control film. In some embodiments, a plurality of second microstructures is formed on the second side of the light control films and are configured to reduce the glare produced by light emitted from the light source passing through the film.

10 Claims, 28 Drawing Sheets

Related U.S. Application Data filed on May 30, 2014, provisional application No. 62/142,779, filed on Apr. 3, 2015.

(51) Int. Cl.

| | | |
|---|---|---|
| *F21V 5/00* | (2018.01) | |
| *F21S 8/02* | (2006.01) | |
| *F21V 7/00* | (2006.01) | |
| *F21V 8/00* | (2006.01) | |
| *F21V 5/08* | (2006.01) | |
| *F21Y 105/16* | (2016.01) | |
| *F21Y 115/00* | (2016.01) | |
| *F21Y 105/10* | (2016.01) | |

(52) U.S. Cl.
CPC ......... *G02B 5/0231* (2013.01); *G02B 5/0278* (2013.01); *F21V 5/08* (2013.01); *F21Y 2105/10* (2016.08); *F21Y 2105/16* (2016.08); *F21Y 2115/00* (2016.08); *G02B 6/0036* (2013.01); *G02B 6/0038* (2013.01); *G02B 6/0045* (2013.01)

(56) References Cited

U.S. PATENT DOCUMENTS

| | | | |
|---|---|---|---|
| 8,123,384 B2 | 2/2012 | Negley et al. | |
| 2003/0137618 A1* | 7/2003 | Kim | G02B 6/0036 349/65 |
| 2008/0049165 A1 | 2/2008 | Min et al. | |
| 2009/0129078 A1 | 5/2009 | Hsu et al. | |
| 2010/0033957 A1* | 2/2010 | Lin | G02B 5/0231 362/97.2 |
| 2010/0061090 A1 | 3/2010 | Bergman et al. | |
| 2011/0110116 A1* | 5/2011 | Peiler | G02B 6/0036 362/612 |
| 2012/0080710 A1* | 4/2012 | Inoue | G02B 5/045 257/98 |
| 2012/0170315 A1* | 7/2012 | Fan | G02B 5/045 362/613 |
| 2012/0275185 A1* | 11/2012 | Edamitsu | F21V 5/02 362/606 |
| 2014/0055859 A1 | 2/2014 | Vasylyev | |
| 2014/0177278 A1* | 6/2014 | Sakamoto | G02B 6/0065 362/625 |

* cited by examiner

FIG. 2A
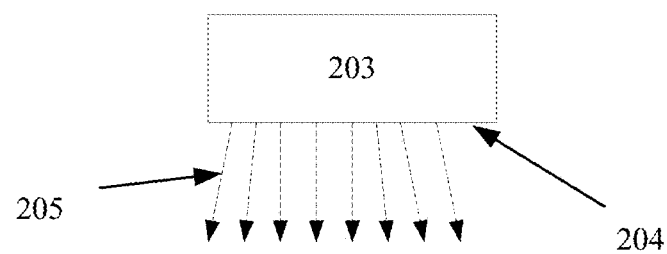
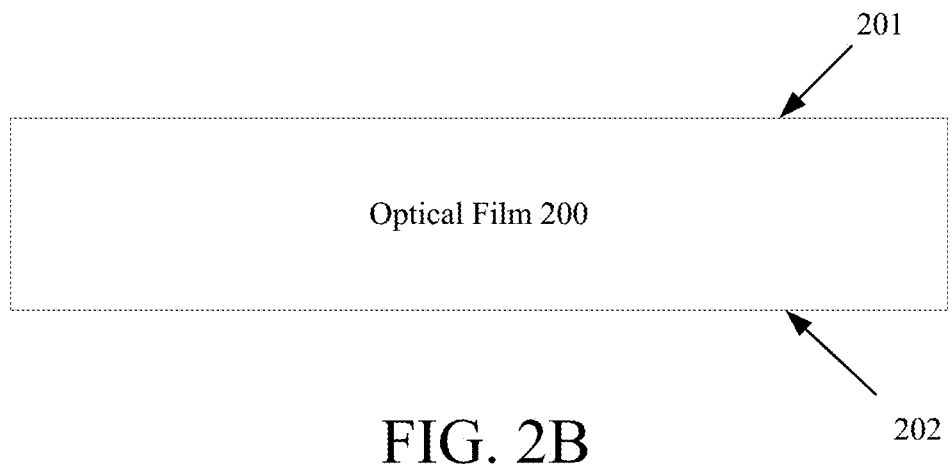
FIG. 2B

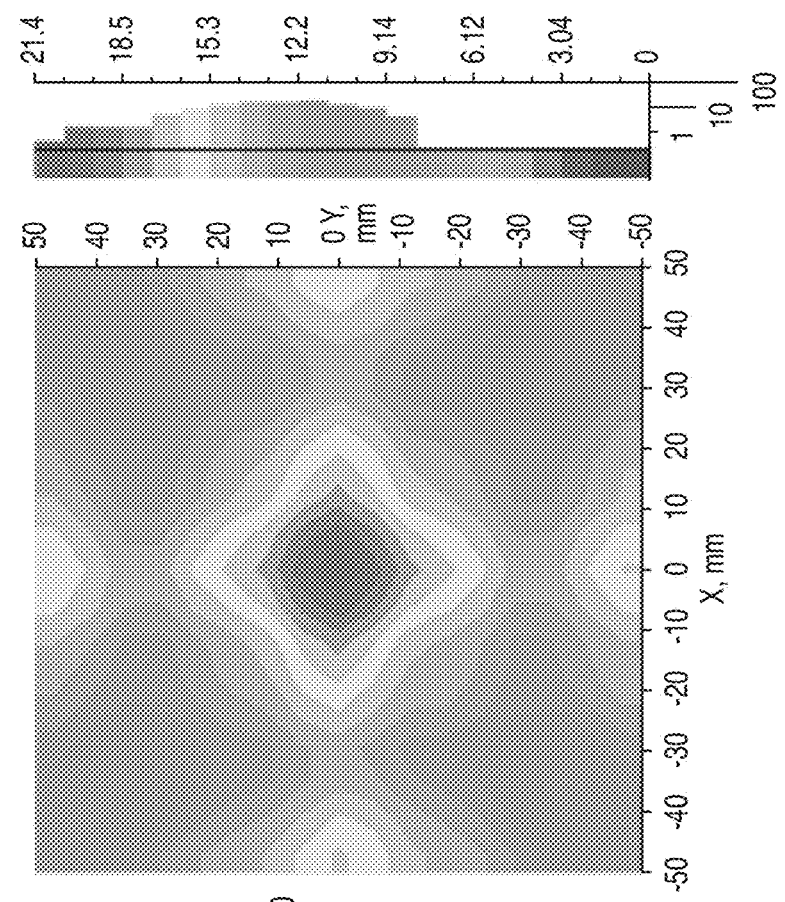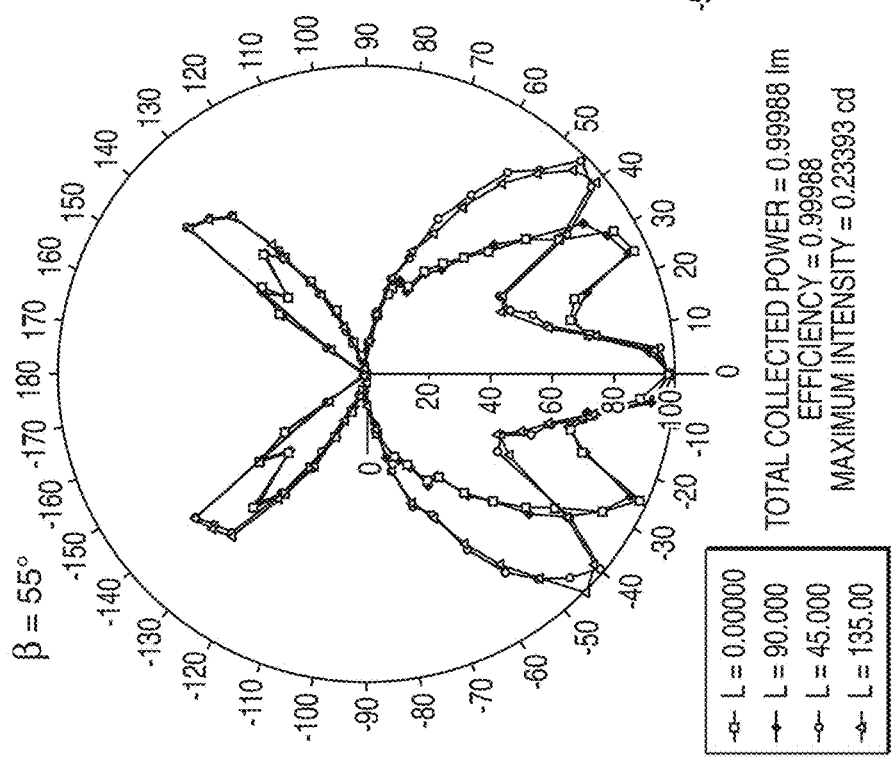
FIG. 4E

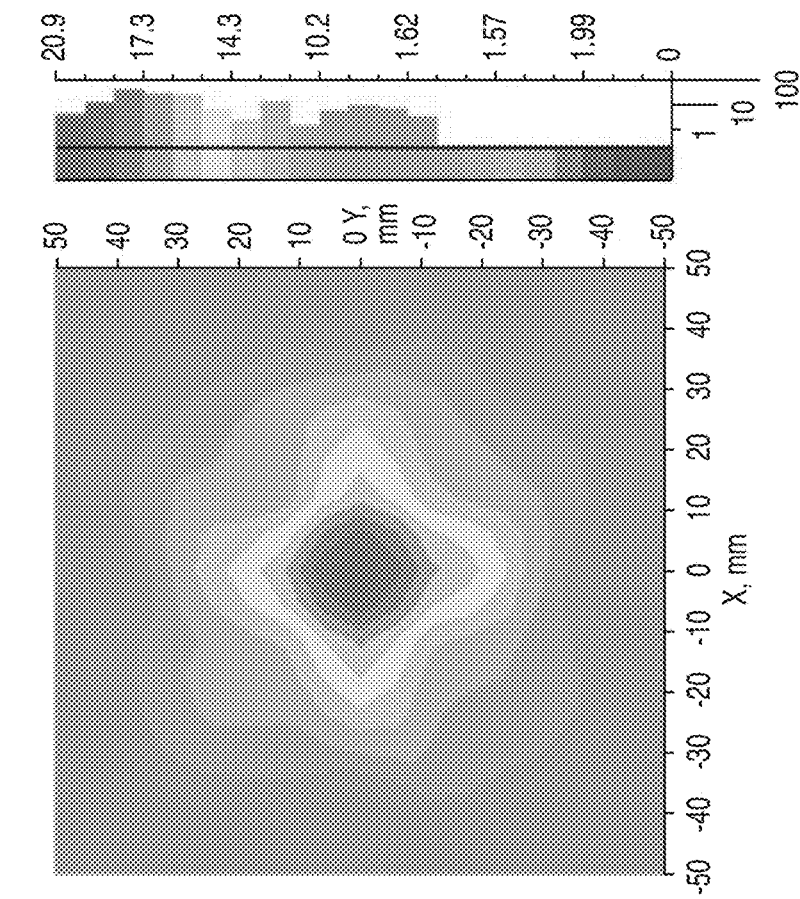
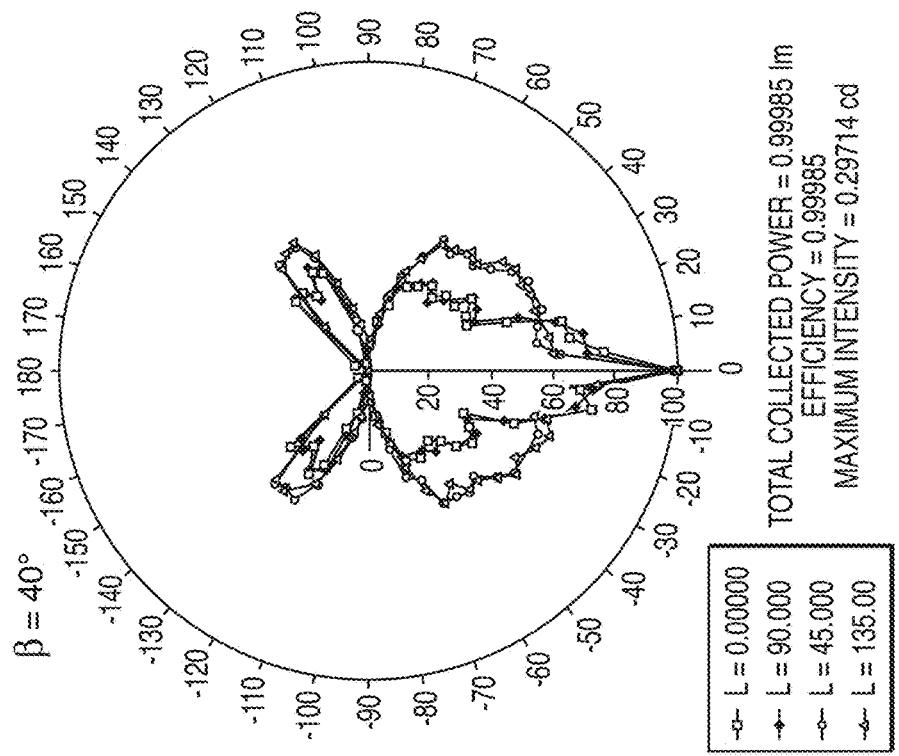
FIG. 4H

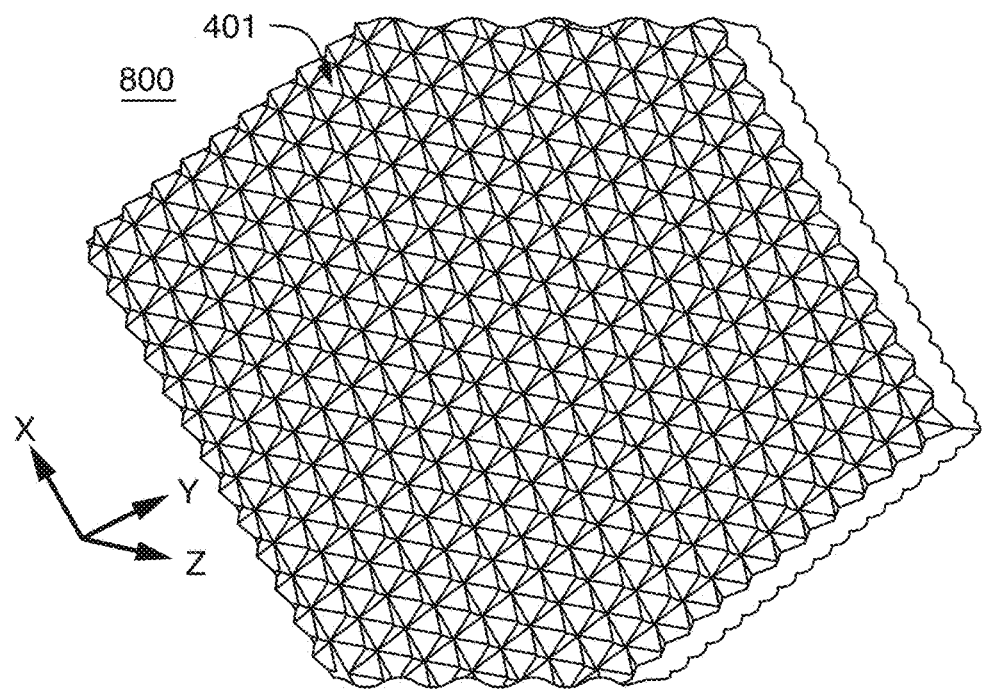
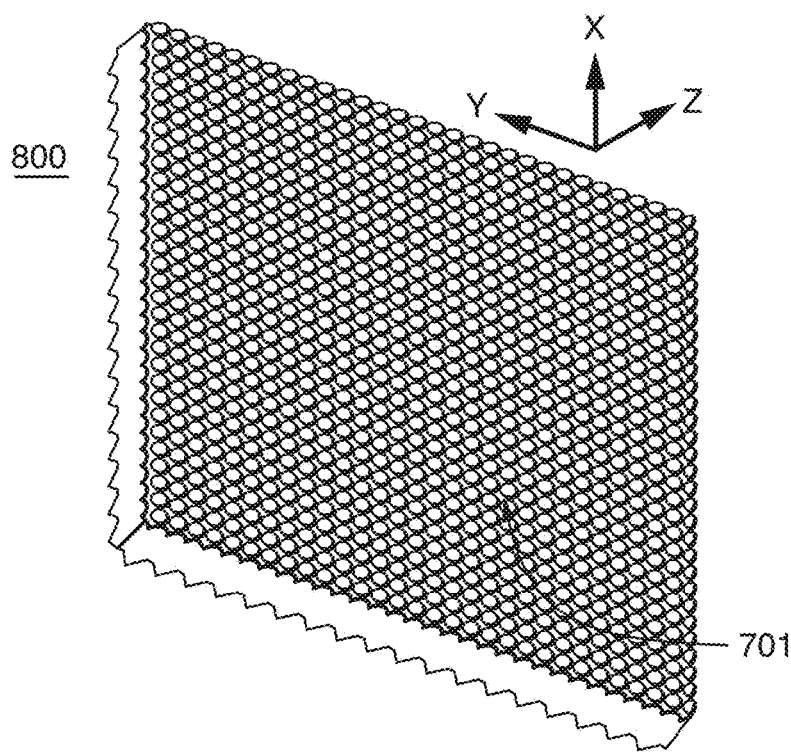
FIG. 8B

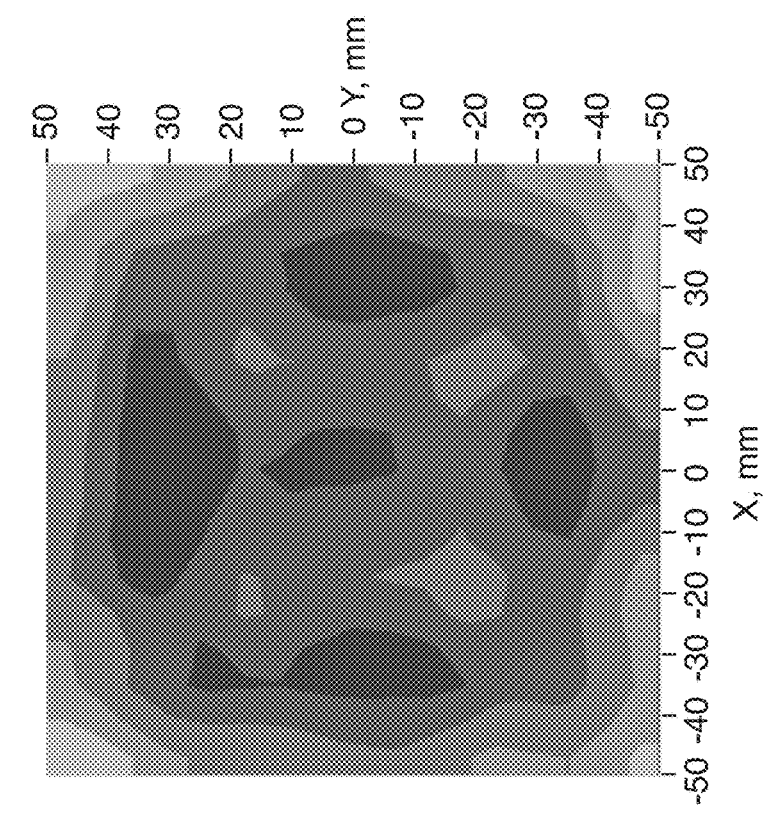
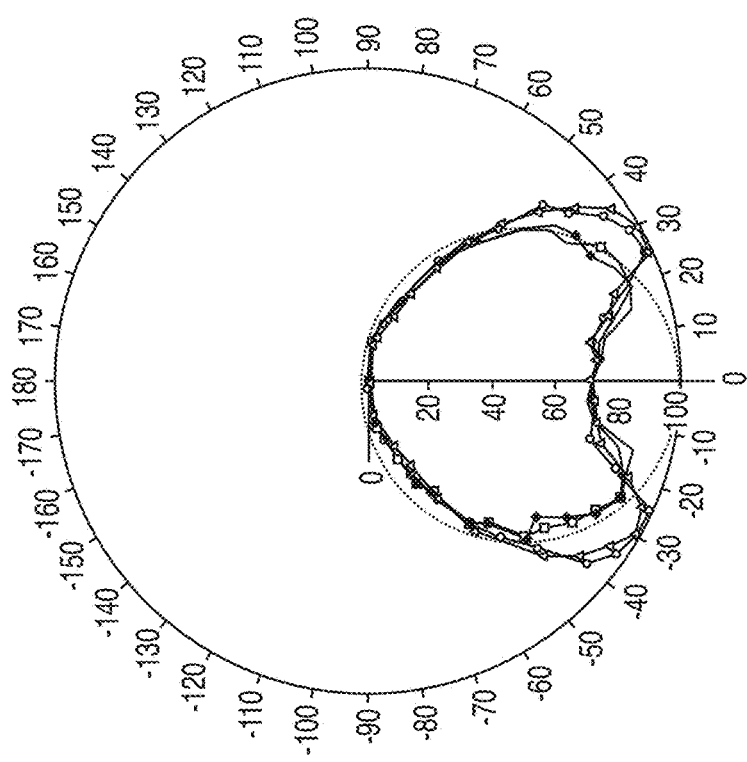
FIG. 8C

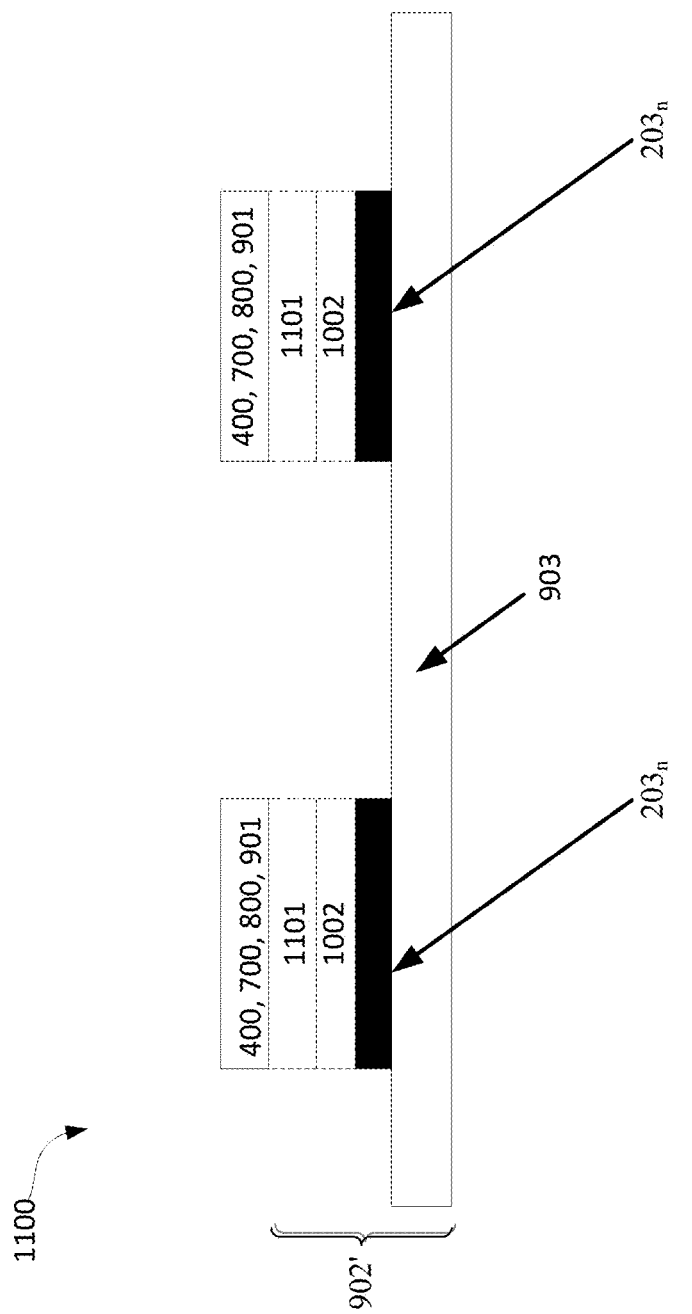

LIGHT CONTROL FILMS AND LIGHTING DEVICES INCLUDING SAME

CROSS-REFERENCE TO RELATED APPLICATIONS

The present application is a National Stage application of, and claims priority of, International Application No. PCT/US2015/033604, which claims priority of U.S. Provisional Application No. 62/005,946, entitled "OPTICAL FILM WITH MICROSTRUCTURES ON OPPOSING SIDES" and filed May 30, 2014, U.S. Provisional Application No. 62/142,779, entitled "OPTICAL FILM AND CHIP PACKAGE WITH ENGINEERED MICROSTRUCTURES" and filed Apr. 3, 2015, and U.S. Provisional Application No. 62/005,963, entitled "HYBRID OPTICS" and filed May 30, 2014, the entire contents of all of which are hereby incorporated by reference.

TECHNICAL FIELD

The present disclosure relates to lighting, and more specifically, to light control films and lighting devices including such films.

BACKGROUND

Lighting devices including one or more solid state light sources such as light emitting diodes (hereinafter, LED or LEDs) are often used to illuminate various spaces. Due to their size and configuration, light emitted from a solid state light source often appears as though it originates from a single point. A lighting device (e.g., lamp, light engine, light module, luminaire, fixture, etc., including combinations thereof) including one or more solid state light sources may therefore be observed to produce light that blends together, but which originates from one or more distinct points. As a result, variations in the intensity of the light at various points of the lighting device may be observed, e.g., as bright spots, dim spots, and the like. Moreover, the light output from such lighting devices may have a lambertian distribution.

SUMMARY

As briefly described in the background, lighting devices including solid state light sources often produce light having a lambertian distribution. One example of a lambertian distribution is shown in FIG. 1A, which plots candlepower vs. the angle from center of a bare solid state light source. As shown in the example of FIG. 1A, light is emitted down from the bare solid state light source, with the highest intensity light located directly below the bare solid state light source (i.e., at 0 degrees). Such a light distribution can be unsuitable for some applications, and particularly in instances where the lighting device includes a plurality of bare solid state lighting devices (e.g., solid state light sources) that each emit light in a lambertian distribution. Indeed, such lighting devices can produce non-uniform luminance on the ground (or other illuminated target) with relative small spacing ratio between regions of high intensity. Moreover, each solid state light source in the array may be visible to an observer, which may be undesirable in some instances.

With the foregoing in mind interest has grown in the production of solid state lighting devices that include solid state light sources such as one or more solid state light sources, wherein the device produces an aesthetically pleasing relatively uniform light distribution and/or has an aesthetically pleasing uniform appearance. In many instances, a relatively uniform light distribution may result when a lighting device and/or the light sources therein emit light in a so-called "batwing" distribution. One example of a batwing distribution is shown in FIG. 1B, which is plot of simulated candlepower vs. angle from center of a light engine including one or more light emitting diodes. As shown in this example, the light engine produces a light distribution in which two regions of high intensity light are offset from a center axis of the lighting engine, in this case at about +/−30 degrees off center. As may be appreciated, such a light distribution may facilitate mixing of light from adjacent light engines/sources, resulting in a more uniform illuminance on the ground or other target plane.

The non-uniform appearance produced by use of solid state light sources in lighting devices, as described above, may be undesirable for some applications, particularly in instances where a uniform light distribution and appearance is desired. Further, a lambertian distribution may not be suitable for many applications. With the foregoing in mind interest has grown in the production of lighting devices that include solid state light sources, wherein the lighting device produces an aesthetically pleasing uniform light distribution and/or has an aesthetically pleasing uniform appearance. In this regard, some research has been performed on the use of special optics to enhance the uniformity of the light distribution produced by a light emitting diode. Such research has shown that improvements to the uniformity of the distribution of light produced by solid state light sources in a lighting device may be attained, e.g., through the use of special optics (e.g., lenses and/or multilayer films) that are placed over the a solid state light source(s). Although promising, the special optics used in such approaches may negatively affect the efficiency of the lighting device, e.g., by reducing the total light output therefrom, which may be undesirable in some applications. These special optics, although useful, can add cost and create other issues such as increased glare and/or sensitivity to the position of a light source.

Embodiments provide light control films with microstructures to adjust or otherwise modify the distribution of light emanating from solid state light sources within a lighting device. These light control films include a first side and a second side, with microstructures present on the first side, the second side, or both, that are configured to alter the distribution of light passing through the light control film. Such films may be applied independently or in conjunction with other structures such as one or more diffuser layers, so as to alter the distribution of light emanating from a lighting device and/or a light source. In particular, in various embodiments the light control films may be configured to produce a batwing distribution of light from incident light from one or more light sources, such as one or more solid state light sources.

In an embodiment, there is provided a light control film. The light control film includes: a single layer of light transparent material comprising a first side and a second side; and a plurality of first microstructures formed on the first side; wherein the light control film is configured to receive incident light from a light source on the first side and to produce an off-axis light distribution in a light field downstream of the second side.

In a related embodiment, the plurality of first microstructures may be selected from the group of grooves, pillars, partial spheres, partial ovals, partial ellipse, multiple sided pyramids, multiple sided frustums, cones, or one or more combinations thereof. In a further related embodiment, the plurality of first microstructures may include the multiple sided pyramids. In a further related embodiment, the multiple sided pyramids may each be inverse pyramids having a point embedded into the first side of the single layer of light transparent material and a roof comprising a plurality of segments.

In another further related embodiment, the inverse pyramids each may include first, second, third, and fourth sides, wherein each roof may have a quadrilateral shape defined by first, second, third, and fourth segments, and wherein a geometry of the inverse pyramids may be defined at least in part by a first, second, third, and fourth sidewall angles $\beta_1$-$\beta_4$, the first sidewall angle $\beta_1$ defined between the first side and the first segment, the second sidewall angle $\beta_2$ defined between the second side and the second segment, the third sidewall angle $\beta_3$ defined between the third side and the third segment, and the fourth sidewall angle $\beta_4$ defined between the fourth side and the fourth segment, and the first, second, third, and fourth sidewall angles $\beta_1$-$\beta_4$ may each be in the range of about 40 degrees to about 60 degrees. In a further related embodiment, the first, second, third, and fourth sidewall angles $\beta_1$-$\beta_4$ may be the same, and may be in the range of about 45 to about 55 degrees.

In still another further related embodiment, the inverse pyramids each may include first, second, third, and fourth sides, each roof may have a quadrilateral shape defined by first, second, third, and fourth segments, and a geometry of the inverse pyramids may be defined at least in part by a first, second, third, and fourth corner angles $\alpha_1$-$\alpha_4$, the first corner angle $\alpha_1$ defined between the first segment and the second segment, the second corner angle $\alpha_2$ defined between the second segment and the third segment, the third corner angle $\alpha_3$ defined between the third segment and the fourth segment, and the fourth corner angle $\alpha_4$ defined between the first segment and the fourth segment, and the first, second, third, and fourth corner angles $\alpha_1$-$\alpha_4$ may each be in the range of about 70 to about 120 degrees.

In yet another further related embodiment, each roof may have a quadrilateral shape defined by first, second, third, and fourth segments, at least two of the first, second, third, and fourth segments may be parallel to one another, and the parallel segments may be oriented relative to a horizontal plane of the light control film by a first orientation angle and a second orientation angle, the first orientation angle and the second orientation angle may each be 90 degrees relative to the horizontal plane. In a further related embodiment, the first orientation angle may be less than 90 degrees relative to the horizontal plane, and the second orientation angle may be greater than 90 degrees relative to the horizontal plane.

In another related embodiment, the light control film may further include a plurality of second microstructures on the second side, the second microstructures configured to reduce glare in the off axis light distribution. In a further related embodiment, the plurality of second microstructures may be selected from the group of grooves, pillars, partial spheres, partial ovals, partial ellipse, multiple sided pyramids, multiple sided frustums, cones, or one or more combinations thereof. In a further related embodiment, the plurality of second microstructures may include partial spheres or pillars. In another further related embodiment, the plurality of second microstructures each may include a height, a width, and a height:width aspect ratio, and the height:width aspect ratio may range from about 5:1 to about 1:5. In a further related embodiment, the height:width aspect ratio may range from about 1:2 to about 1:1.

In still another further related embodiment, the light control film may further include a plurality of second microstructures on the second side, the second microstructures configured to reduce glare in the off axis light distribution.

In a further related embodiment, the plurality of second microstructures may be selected from the group of grooves, pillars, partial spheres, partial ovals, partial ellipse, multiple sided pyramids, multiple sided frustums, cones, or one or more combinations thereof. In a further related embodiment, the plurality of second microstructures may include partial spheres or pillars.

In another further related embodiment, the plurality of second microstructures each may include a height, a width, and a height:width aspect ratio, and the height:width aspect ratio may range from about 5:1 to about 1:5. In a further related embodiment, the height:width aspect ratio may range from about 1:2 to about 1:1.

In another embodiment, there is provided a lighting device. The lighting device includes: at least one light source configured to emit light; and a light control film, including: a single layer of light transparent material having a first side and a second side; and a plurality of first microstructures formed on the first side; wherein the light control film is configured to receive incident light emitted by the light source on the first side and to produce an off-axis light distribution in a light field downstream of the second side.

In a related embodiment, the plurality of first microstructures may be selected from the group of grooves, pillars, partial spheres, partial ovals, partial ellipse, multiple sided pyramids, multiple sided frustums, cones, or one or more combinations thereof. In a further related embodiment, the plurality of first microstructures may include the multiple sided pyramids. In a further related embodiment, the multiple sided pyramids may each be inverse pyramids having a point embedded into the first side of the single layer of light transparent material and a roof comprising a plurality of segments.

In a further related embodiment, the inverse pyramids each may include first, second, third, and fourth sides, each roof may have a quadrilateral shape defined by first, second, third, and fourth segments, and a geometry of the inverse pyramids may be defined at least in part by a first, second, third, and fourth sidewall angles $\beta_1$-$\beta_4$, the first sidewall angle $\beta_1$ defined between the first side and the first segment, the second sidewall angle $\beta_2$ defined between the second side and the second segment, the third sidewall angle $\beta_3$ defined between the third side and the third segment, and the fourth sidewall angle $\beta_4$ defined between the fourth side and the fourth segment, and the first, second, third, and fourth sidewall angles $\beta_1$-$\beta_4$ may each be in the range of about 40 degrees to about 60 degrees. In a further related embodiment, the first, second, third, and fourth sidewall angles $\beta_1$-$\beta_4$ may be the same, and may be in the range of about 45 to about 55 degrees.

In another further related embodiment, the inverse pyramids each may include first, second, third, and fourth sides, each roof may have a quadrilateral shape defined by first, second, third, and fourth segments, and a geometry of the inverse pyramids may be defined at least in part by a first, second, third, and fourth corner angles $\alpha_1$-$\alpha_4$, the first corner angle $\alpha_1$ defined between the first segment and the second segment, the second corner angle $\alpha_2$ defined between the second segment and the third segment, the third corner angle $\alpha_3$ defined between the third segment and the fourth segment, and the fourth corner angle $\alpha_4$ defined between the first segment and the fourth segment, and the first, second, third, and fourth corner angles $\alpha_1$-$\alpha_4$ may each be in the range of about 70 to about 120 degrees.

In still another further related embodiment, each roof may have a quadrilateral shape defined by first, second, third, and fourth segments, at least two of the first, second, third, and fourth segments may be parallel to one another, and the parallel segments may be oriented relative to a horizontal plane of the light control film by a first orientation angle and a second orientation angle, the first orientation angle and the second orientation angle may each be 90 degrees relative to the horizontal plane. In a further related embodiment, the first orientation angle may be less than 90 degrees relative to the horizontal plane, and the second orientation angle may be greater than 90 degrees relative to the horizontal plane.

In another related embodiment, the lighting device may further include a plurality of second microstructures on the second side, the second microstructures configured to reduce glare in the off axis light distribution. In a further related embodiment, the plurality of second microstructures may be selected from the group of grooves, pillars, partial spheres, partial ovals, partial ellipse, multiple sided pyramids, multiple sided frustums, cones, or one or more combinations thereof. In a further related embodiment, the plurality of second microstructures may include partial spheres or pillars. In another further related embodiment, the plurality of second microstructures each may include a height, a width, and a height:width aspect ratio, and the height:width aspect ratio may range from about 5:1 to about 1:5. In a further related embodiment, the height:width aspect ratio may range from about 1:2 to about 1:1.

In still another related embodiment, the lighting device may further include a plurality of second microstructures on the second side, the second microstructures configured to reduce glare in the off axis light distribution. In a further related embodiment, the plurality of second microstructures may be selected from the group of grooves, pillars, partial spheres, partial ovals, partial ellipse, multiple sided pyramids, multiple sided frustums, cones, or one or more combinations thereof. In a further related embodiment, the plurality of second microstructures may include partial spheres or pillars.

In another further related embodiment, the plurality of second microstructures each may include a height, a width, and a height:width aspect ratio, and the height:width aspect ratio may range from about 5:1 to about 1:5. In a further related embodiment, the height:width aspect ratio may range from about 1:2 to about 1:1.

In still another related embodiment, the lighting device may further include a diffuser layer.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 2A illustrates a light control film according to embodiments disclosed herein.

FIG. 2B illustrates a lighting device including a light control film according to embodiments disclosed herein.

FIGS. 4D-4H depict example light distributions produced by a lighting device including a light distribution film consistent with FIGS. 4A and 4B, wherein the first microstructures therein have various sidewall angles.

FIG. 8B depicts perspective views of a first side and a second side of a light control film consistent with FIG. 8A.

FIG. 8C depicts simulated distributions of light produced by a lighting fixture including a light distribution film consistent with FIG. 8A.

FIG. 11 illustrates another lighting device including a light control film according to embodiments disclosed herein.

DETAILED DESCRIPTION

Figure 1A:
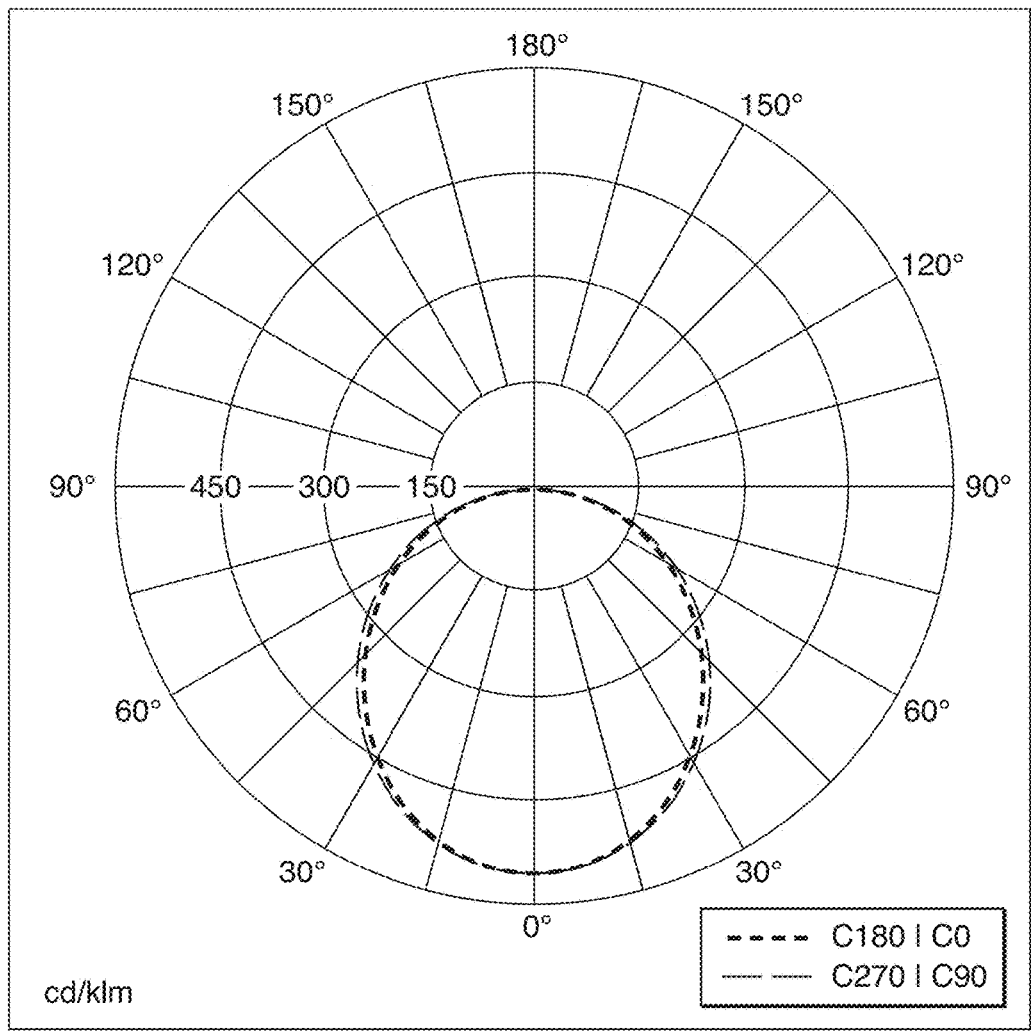
FIGS. 1A-1B depict light distributions produced by a lighting device.
Figure 1B:
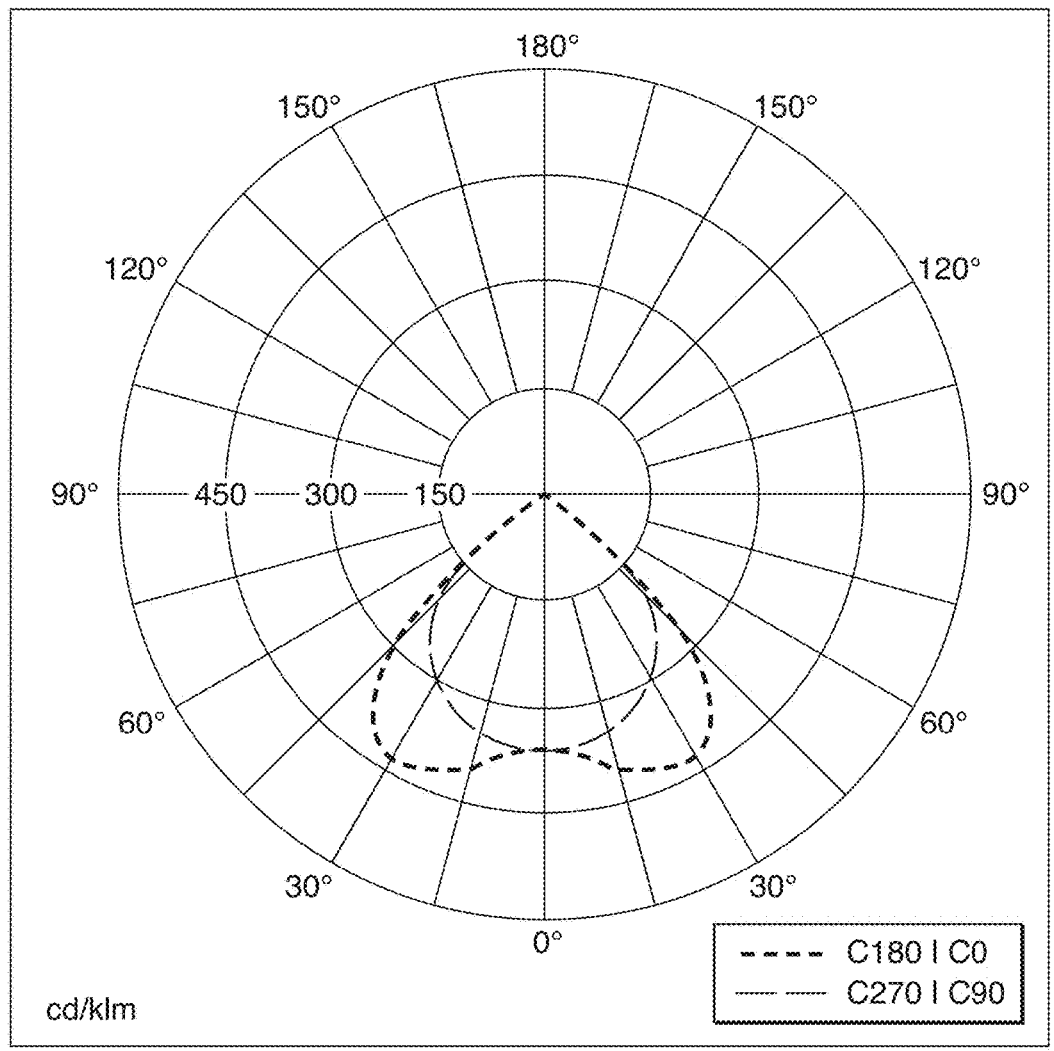

The present disclosure will now proceed with reference to the accompanying drawings, which illustrate example embodiments consistent with the present disclosure. It should be understood that the examples in the figures are for the sake of illustration and ease of understanding only. Moreover is should be understood that the light control films and lighting devices described herein may be embodied in many forms and are not limited to the illustrated embodiments shown in the figures or specific embodiments described herein. One or more elements of the present disclosure may be numerically designated, e.g., as a first, second, third, etc. element. In this context it should be understood that the numerical designation is for the sake of clarity only (e.g., to distinguish one element from another), and that elements so designated are not limited by their specific numerical designation. Moreover the specification may from time to time refer to a first element as being "on" a second element. In that context it should be understood that the first element may be directly on the second element (i.e., without intervening elements there between), or that one or more intervening elements may be present between the first and second elements. In contrast, the term "directly on" means that the first element is present on the second element without any intervening elements there between.

From time to time one or more aspects of the present disclosure may be described using ranges. In such instances it should be understood that the indicated ranges are exemplary only unless expressly indicated otherwise. Moreover, the ranges should be understood to include all of the individual values falling within an indicated range, as though such values were expressly recited. Moreover, the ranges should be understood to encompass sub ranges within the indicated range, as though such sub ranges were expressly recited. By way of example, a range of 1 to 10 should be understood to include 2, 3, 4 . . . etc., as well as the range of 2 to 10, 3 to 10, 2 to 8, etc., as though such values and ranges were expressly recited.

As used herein, the term "solid state light source" refers to any type of carrier injection/junction-based system that is capable of generating radiation in response to an electrical signal. Thus, the term solid state light source includes, but is not limited to, various semiconductor-based structures that emit light in response to current, light emitting diodes, organic light emitting diodes, light emitting compounds, organic light emitting compounds, light emitting polymers, light emitting strips, electro-luminescent strips, combination thereof and the like. In particular, the term solid state light source refers to light emitting diodes of all types (including semi-conductor and organic light emitting diodes) that are configured to generate light in all or various portions of one or more of the visible, ultraviolet, and infrared spectrum, whether broadly (e.g., over the entire visible light spectrum) or narrowly (e.g., within the range of certain wavelengths only).

While the specification describes various embodiments in which a solid state light source is used as a light source, it should be understood that the light control films described herein may be used with any suitable light source, such as but not limited to incandescent light sources, fluorescent light sources, high pressure gas discharge light sources, and the like. Further, the term "lighting device" is used herein to refer to one or more devices that may include one or more light sources. Non-limiting examples of lighting devices include solid state lighting packages (e.g., LED packages), lighting fixtures, light engines, light modules, luminaires, lamps, combinations thereof, and the like.

Throughout this application, the directional terms "up", "down", "upward", "downward", "top", "bottom", "side", "lateral", "longitudinal", "room facing", "ceiling facing", "wall facing", "light source facing", and the like may be used to describe the absolute and relative orientations and/or positions of particular elements. For example, some embodiments herein refer to a "second," "room facing" or "back" side of a light control film through which light exits, and a "first," "ceiling facing" or "front" side of a light control film, which faces one or more light sources (and may also be referred to as a "light source facing" side of the light control film). In this example "room facing" or "back", and "ceiling facing" or "front", along with "light source facing", are used to indicate typical orientations when the light control films described herein are installed and operational, e.g., in a downlight luminaire within a ceiling or a ceiling grid tile. It should be understood that these orientation terms are used only for convenience, and are not intended to be limiting. Thus for example when a light control film according to embodiments described herein is packaged in a box, resting on a counter, leaned up against a wall, or in various stages of assembly on an assembly line, the light control film may be positioned in any orientation but will still have a "ceiling facing" or "front" or "light source facing" side that faces a light source and a "room facing" or "back" side through which light would exit the light control film if it were installed in relation to light sources in a lighting device. In other words, the orientation terms are used for ease of description and may be used regardless of the actual orientation of a light control film at a given point in time.

For ease of description and to facilitate understanding, the present disclosure describes various embodiments in which a light control film is indicated as having a "first," "room facing" or "downward facing" side, as well as a "second," "ceiling facing," or "light source facing" side. It should be understood however, that such embodiments are not limited to the indicated orientations. Indeed the light control films described herein can be used in any suitable orientation. Therefore a side of a light control film that is described as a second, room facing or downward facing side may be and in some embodiments is oriented such that it faces a light source, ceiling, or a wall, without departing from the scope of the present disclosure. Similarly, a side of light control film that is described as a second, light source facing, or ceiling facing side may be and in some embodiments is oriented such that it faces downward, towards a room, and/or in some other direction. Of course, changing the orientation of the light control films described herein may affect their optical performance. These performance alterations may also change the overall distribution of light downstream of the light control films described herein. Thus for example, when a light control film consistent with the present disclosure oriented in one direction (e.g., with first side facing a light source, it may operate to produce a relatively broad light distribution, e.g., a batwing distribution in the field light downstream of the light control film. In contrast if the same film is oriented with the first side facing away from the light source, it may operate to produce a relatively focused light distribution in the field downstream of the light control film.

Embodiments provide light control films to modify or otherwise adjust the distribution of light emanating from a light fixture and/or one or more light sources (e.g., solid state light sources such as solid state light sources). As will be described in detail below, in some embodiments the light control films described herein may include a first side and a second side. Microstructures may be present on the first side, the second side, or both, and may be configured to alter the distribution of light passing through the light control film. For example, some embodiments of the light control films described herein include a first and second side, wherein first (e.g., light distribution) microstructures are present on at least the first side. Alternatively or additionally, in some embodiments the light control films may include second (e.g., glare control) microstructures on either the first or second side thereof. Such films may be applied independently or in conjunction with other structures such as one or more diffuser layers, so as to alter the distribution of light emanating from a lighting device and/or a light source. In particular, in various embodiments the light control films may be configured to produce a batwing distribution of light from incident light from one or more light sources, such as one or more solid state light sources. That is, light downstream of the light control films described herein may have an off-axis light distribution. More specifically, the light control films may function to produce a light distribution in the field downstream of the light control film that is off-axis relative to an axis of a light source, the light control film, a lens used in conjunction with a light source and/or an aperture of a lighting device with which the light control film may be used. In particular, the light control films described herein may be configured to produce an output light that is off-axis with respect to at least one of a vertical axis of a lighting device, a vertical axis of a light source such as an solid state light source, and/or a vertical axis of an aperture of a housing in which the light source and/or light control film is installed. As used herein, the term "off-axis" when used in connection with a light distribution generally means that the amount of light in the field extending about the axis in question is non-uniform. Put in other terms, an off-axis light distribution may be understood as a distribution in which the concentration of light in at least one (e.g., first) region of a field that is not along an axis in question (e.g., an axis extending through the lens, an axis extending through a light source, an axis perpendicular to a light emitting surface, an axis extending through of an aperture of a housing of a downlight, etc.) is greater or less than the amount of light within another (e.g., second) region that is along the axis in question. Such a distribution may be symmetrical, or not. In some instances, the light control films described herein are configured to produce a batwing light distribution.

Reference is now made to FIG. 2A, which illustrates one example of a light control film 200. As shown, the light control film 200 includes a first side 201 and a second side 202. For the sake of clarity and ease of understanding, the present disclosure will describe embodiments in which the first side 201 faces a light source and the second side 202 faces a room or other target when the light control film 200 is installed, e.g., in a lighting device. The foregoing concept is shown in FIG. 2B, which depicts one example of a lighting device 210 that includes the light control film 200. In the illustrated example, the lighting device 210 includes a light source 203, which in this case is disposed at some distance from the light control film 200. The light source 203 is any suitable light source, including but not limited to incandescent, gas discharge, and solid state light sources, and as shown in FIG. 2B is one or more solid state light sources. Of course, in some embodiments, the light source 203 is a single solid state light source, and in some embodiments, is an array of two or more solid state light sources.

The light control film 200 is manufactured from any suitable material, so long as it transmits at least a portion of light incident thereon. Non-limiting examples of materials that may be used as or in the light control film 200 include polycarbonate, acrylates such as polymethylmethacrylate, polyesters such as polyethylene terephthalate, cellulose acetate, polyethylene, high density polyethylene, cyclo-olefin polymers, combinations thereof, and the like. In some embodiments the light control film 200 is or includes polycarbonate, polymethylmethacrylate, and/or polyethylene terephthalate.

The light control film 200 is generally configured to transmit at least a portion of light incident thereon, e.g., on the second side 202. In some embodiments, the light control film 200 is configured to transmit greater than or equal to about 80% of light incident thereon, in some embodiments, greater than or equal to about 85% of light incident thereon, in some embodiments, greater than or equal to about 90% of light incident thereon, in some embodiments, greater than or equal to about 95% of light incident thereon, and in some embodiments, even greater than or equal to about 99% of light incident thereon. The light control film 200 may have any suitable thickness. For example, in some embodiments the thickness of the light control film 200 ranges from about 0.1 to about 2 mm, and in some embodiments from about 0.2 to about 1 mm. As may be appreciated, the thickness of the light control film may be selected to achieve desirable mechanism strength for regulation, handling, and installation.

As further shown in FIG. 2B, the light source 203 may produce light 205. Light 205 emanating (e.g., from an emitting surface of the light source 203) may have any suitable distribution. For example, the light source 203 may be configured to produce light which, if left unmodified, may have a lambertian or other suitable distribution. In some embodiments, the light source 203 is a solid state light source configured to produce light 205 in a lambertian distribution or another suitable distribution. Regardless, in FIG. 2B, light 205 may impinge on the first side 201 of the light control film 200.

It is noted that for the sake of clarity and ease of understanding, the light control film 200 is illustrated in FIGS. 2A and 2B as being substantially planar, and as being oriented such that the planes of the first and second surfaces are oriented substantially transverse to an emitting axis of the light source 203 (or, in other words, substantially parallel to the emitting surface of the light source 203). It should be understood that such illustration is for the sake of example only, and the light control film 200 may be oriented such that one or more edges thereof are inclined or declined relative to the light source 203. Thus in some embodiments, one or both sides of the light control film 200 are inclined or declined relative to a light emitting surface of the light source 203, e.g., to define a substantially concave, substantially convex, or other shape. In some embodiments, one or more portions of the light control film 200 are non-planar and/or are closer to or farther away from a light emitting surface of the light source 203, relative to the location of other portions of the light control film 200.

A plurality of microstructures (not shown in FIGS. 2A and 2B) may be formed on and/or be integral with the first (e.g., light source facing) side 201, the second (e.g., room facing) side 202, or both sides of the light control film 200. As will be described in detail below, such microstructures, in some embodiments, independently and/or collectively alter the distribution of light that passes through them, such that light downstream of the light control film 200 (i.e., downstream or "output" light) has a desired light distribution. For the sake of clarity, microstructures on and/or integral with the first side (e.g., 201) of a light control film are referred to herein as first microstructures, whereas microstructures on and/or integral with the second side (e.g., 202) of a light control film are referred to herein as second microstructures. Non-liming examples of first and second microstructures that may be used in light control films described herein include relatively small three dimensional structures of any suitable shape, such as but not limited to grooves, pillars, partial spheres (e.g., hemispheres), partial ovals, partial ellipses, three, four, five, six, seven, or more sided pyramids (that is, multiple sided pyramids), frustums, cones, freeform shapes, combinations thereof, and the like, which may be present in a random or ordered manner (e.g., in a pattern) on the first or second side of a light control film. Such microstructure s, in some embodiments, have random or systemic variance, and in some embodiments, have a cross sectional profile with any suitable shape. For example, in embodiments where microstructures in the form of grooves are used, such grooves may have a cross sectional profile having a V-shape, a W-shape, a square shape, or any other suitable shape. In any case, the first and/or second microstructures may extend from and/or be embossed or otherwise embedded into a first or second surface of a light control film.

In some embodiments, the light control film 200 includes first microstructures in the form of grooves having a triangular cross sectional profile. Alternatively or additionally, in some embodiments, the light control film 200 includes first microstructures in the form of three, four, five, six, seven, or more sided pyramids. Such microstructures may be present on or are integral with the first side 201, and may be used independently or in conjunction with second microstructures, e.g., on and/or integral with the second side 202. In some embodiments, the second microstructures are in the form of partial spheres (e.g., hemispheres), partial ellipses, partial ovals, or some combination thereof. In such embodiments, the first microstructures may be configured to produce a relatively broad light distribution (e.g., a batwing distribution) in the field downstream of the light control film. The second microstructures may be likewise configured, or configured to perform some other function. For example, in some embodiments the second microstructures may be configured to prevent, reduce, substantially eliminate, or even eliminate glare. As used herein, glare may refer generally to highly intense light emanating from the light source itself, and in some instances more specifically to light emanating from a light source at relatively high angle, e.g., greater than or equal to about 50 degrees or, in some instances, greater than or equal to about 60 degrees.

Regardless of their shape, the first and second microstructures described herein may be distributed on the first and/or second sides of the light control films described herein in any suitable manner. In some embodiments, first microstructures are included on or integral with the first side of a light control film, and are distributed in random, pseudo-random, and/or ordered manner. In some embodiments, first microstructures are formed in a pseudo-random and/or ordered pattern on a first side of a light control film consistent with the present disclosure. For example, the first microstructures may be arranged in grid like manner, wherein first microstructures in adjacent rows and/or columns are aligned or offset relative to one another. Alternatively or additionally, the light control films may also include second microstructures on and/or integral with a second side thereof. In such embodiments, the second microstructures, like the first microstructures, may be distributed in a random, pseudo random, and/or ordered manner on the second side. In some embodiments, the second microstructures are formed in a pseudorandom and/or ordered pattern on a second side of a light control film consistent with the present disclosure. In some embodiments, the second microstructures may be arranged in a grid like manner on the second side, wherein second microstructures in adjacent rows and/or columns are aligned or offset relative to one another. In embodiments where both first and second microstructures are used, such microstructures may or may not be registered to one another. This may be particularly useful when the first and second microstructures are each present as an ordered array (e.g., a pattern).

The spacing (e.g., period) of the first and/or second microstructures may impact the distribution of the output light emanating from the light control film and/or the appearance thereof. For example, in some embodiments by controlling spacing of the first and/or second microstructures, more patterns may be produced on the film, which may or may not be desirable depending on the application. As a result, it may be desirable to control the spacing of the first and/or second microstructures. In some embodiments, the first microstructures may be formed on or integral with the first surface of a light control film, such that a distance or "period" between adjacent first microstructures is within a desired range. The period may, for example, be defined as the distance between equivalent positions on adjacent microstructures. The period may therefore be understood to correlate to the distance between, for example, the center of a base of adjacent microstructures, the distance between two of the same corners of adjacent microstructures, etc. Without limitation, the period of the first and/or microstructures may be defined as a distance between the centers of adjacent microstructures, and may range from about 10 to about 200 microns ($\mu$m), from about 20 to about 150 $\mu$m, or from about 50 to about 110 $\mu$m. In some embodiments, the period of the first microstructures is smaller or larger than the period of the second microstructures. For example in some embodiments, the period of the first microstructures may fall within the above noted ranges, whereas the period of the second microstructures may range from about 10 to about 100 $\rho$, from about 10 to about 75 $\mu$m, or from about 10 to about 50 $\mu$m.

In some embodiments, both the first and second microstructures may be arranged in a grid like manner on the first and second surfaces of a light control film, respectively. In such embodiments, the spacing (e.g., period) of the first microstructures may be the same or different as the spacing (e.g., period) of the second microstructures. In some embodiments, the period of the first microstructures on the first side is the same as the period of the second microstructures on the second side. Alternatively in other embodiments, the period of the first microstructures is greater or less than the period of the second microstructures.

The first and second microstructures of the present disclosure may be configured to impart certain properties to the light control films described herein. For example, in some embodiments the first microstructures may be configured to receive incident light with a first light distribution (e.g., from a light source such as an solid state light source), and to alter the path of the incident light such that output light emanating from the light control film has a desired light distribution, such as but not limited to a batwing distribution. The second microstructures may be similarly configured (e.g., to cause the light control film to produce a desired light distribution and/or with other desired properties), either independently of the first microstructures or by working in conjunction with the first microstructures. For example and as will be described in detail below, in some embodiments the second microstructures may be configured to prevent or limit glare, e.g., from one or more light sources. The second microstructures may accomplish this, for example, by limiting the output of light from the light control film above one or more offset angles, by obscuring a source of high intensity light, by diffusing light, or some combination thereof. Of course, the first and second microstructures described herein may be configured in another manner and to achieve other optical effects, as may be appreciated by one of skill in the art.

The microstructures described herein may be of any suitable dimensions, and may be symmetrical or asymmetrical. By way of example, in some embodiments the microstructures described herein may have at least one dimension (e.g., length, width, height) ranging from about 0.5 to about 250 µm, from about 1 to about 200 µm, from about 1 to about 150 µm, from about 1 to about 100 µm, or from about 1 to about 50 µm. In some embodiments, the microstructures described herein have at least one dimension that is greater than 5 microns, as smaller dimensions may produce diffraction effects that may be undesirable for some applications. Of course microstructures with other dimensions may also be used, and are envisioned by the present disclosure.

In some embodiments the microstructures described herein have at least one dimension (e.g., length, width, height) that is set in relation to one or more wavelengths of light incident thereon, e.g., from a light source. For example in some embodiments, the first and/or second microstructures described herein may have at least one dimension that is from about five to about ten times larger than a wavelength of light incident thereon. Thus for example, in embodiments where light incident on the microstructures is of a wavelength ranging from about 390 nm to about 700 nm, the microstructures may have at least one dimension that is greater than or equal to about 1.95 µm, or greater than or equal to about 7 µm.

As noted above, the first and second microstructures may be on and/or integral with one or more sides of a light control film. In this regard it is noted that the microstructures consistent with the present disclosure may be formed in any suitable manner. For example, microstructures consistent with the present disclosure may be formed by molding, imprinting, embossing, lithography, etc. microstructures on and/or into a corresponding surface of a light control film. In the case of molding, for example, a precursor material may be provided into a mold of first or second microstructures. The mold may then be applied to a substrate (e.g. made of the same material as the light control film 200) or vice versa. The precursor material may then be cured while the mold is in contact with the surface of the substrate, e.g., by exposure to heat, ultraviolet or other light, combinations thereof, and the like. The mold may then be removed, resulting in the production of a light control film in which microstructures are present on a first or second side of the substrate. Alternatively or additionally, a blank film (made of the same material as the light control film 200) may be provided. The first and/or second surface of the film may be softened, e.g., by exposure to heat or in some other manner. Subsequently, a template bearing a relief of the first or second microstructures may be pressed into the softened first and/or second surface, so as to form the first and/or second microstructures therein. The template may then be removed, resulting in the production of a light control film in which microstructures are integral with a first or second side of the substrate. Similar results may be achieved, for example, using lithography or other patterning techniques.

In either case it should be understood that the light control films described herein may be in the form of a single layer and/or as a single, integral structure that includes first and/or second microstructures. In some embodiments, the light control films described herein are preferably in the form of a single layer, wherein first microstructures are present on, embossed in, or otherwise embedded within a first side thereof, and second microstructures are optionally present on, embossed in, or otherwise embedded within a second side thereof. As may be appreciated, such light control films may lack interfaces between differing materials that may negatively impact optical performance, e.g., by lowering optical efficiency. In this regard, it is noted that the light control films described herein in some embodiments exhibit high optical efficiency. For example in some embodiments, the light control films described herein can exhibit an optical efficiency of greater than or equal to about 80%, about 85%, about 90%, about 95%, or about 99% or more.

Of course, the light control films described herein need not be in the form of a single layer. For example, in some embodiments first and/or second microstructures may be present on or in a separate film that may be laminated onto the first of a substrate, resulting in the production of a light control films similar to that of illustrated by various figures of the present disclosure, albeit in a multilayer structure. While the use of such a multilayer structure may present some advantages (e.g., with regard to manufacturing), it should be understood that the use of multiple layers may introduce interfaces that may negatively impact optical performance, e.g., by limiting or otherwise reducing the amount of light that may pass through the light control film. This may be manifested as a reduction in optical efficiency, which may be undesirable in some applications.

Figure 3A:
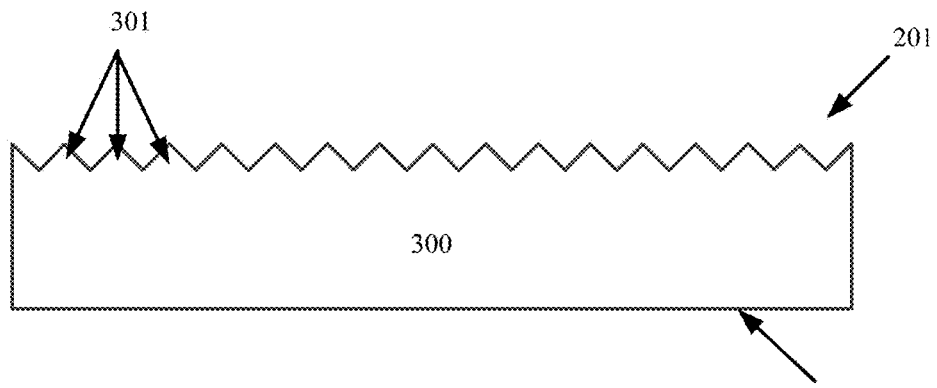
FIG. 3A illustrates a light control film including first microstructures according to embodiments disclosed herein.
Figure 3B:
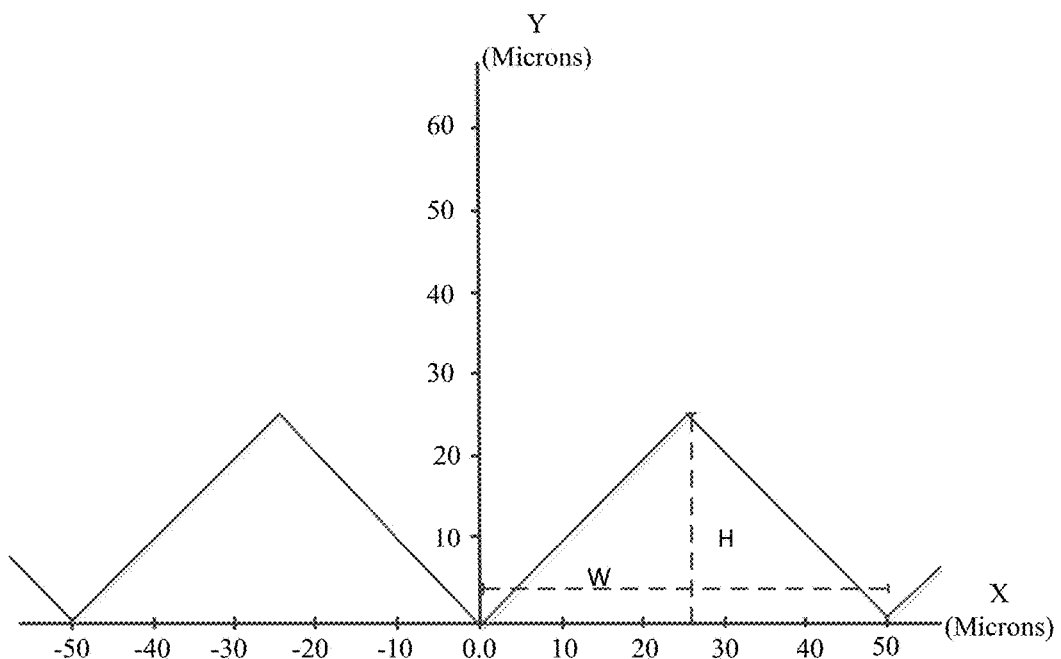
FIG. 3B is a cross sectional diagram of first microstructures according to embodiments disclosed herein.
Figure 3C:
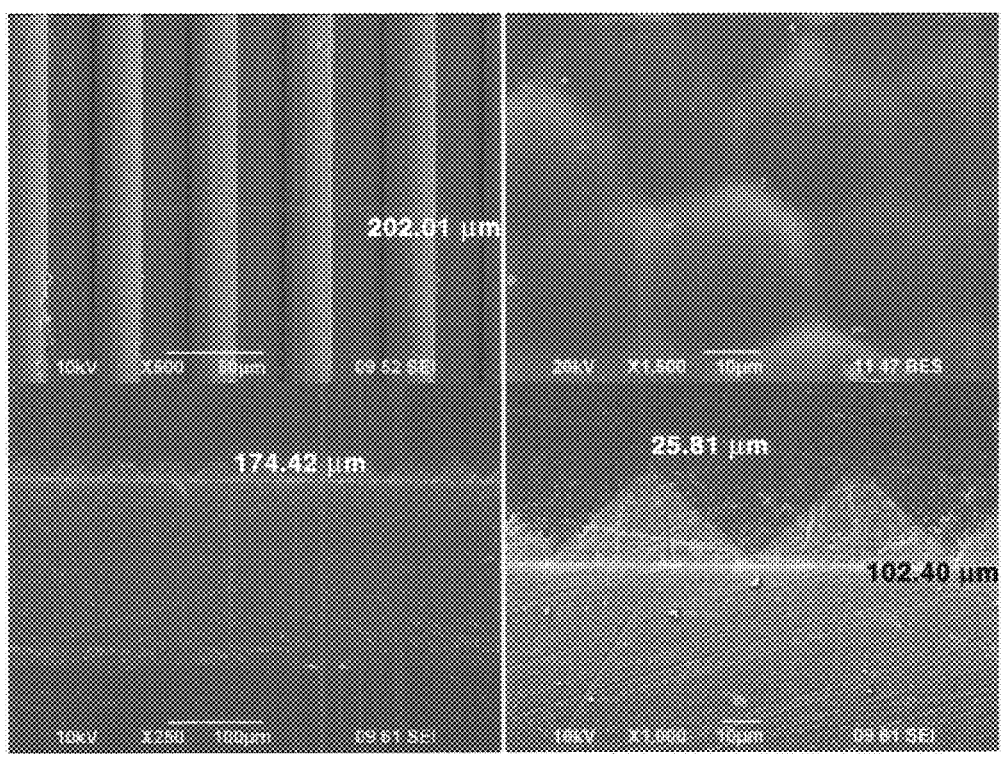
FIG. 3C. depicts scanning electron microscope (SEM) images of first microstructures according to embodiments disclosed herein.

Reference is now made to FIG. 3A, which depicts a cross sectional view of one example of a light control film including first microstructures consistent with the present disclosure. Like the light control film 200, a light control film 300 includes a first side 201 and a second side 202. As shown, in this embodiment a plurality of first microstructures 301 is formed on the first side 201. In this embodiment, the plurality of first microstructures 301 are in the form of a plurality of grooves which have a triangular (e.g., V-shaped) cross sectional profile, as shown in FIGS. 3A-3C. Of course, grooves with a different (e.g., W-shaped, sawtooth shape) cross-sectional profile may also be used, as described above. Furthermore while the plurality of first microstructures 301 are illustrated as having a V-shape with upper surfaces that extend at about a +/−45 degree angle relative to a horizontal axis of the light control film 300, other structures may be used. Indeed the present disclosure envisions the use of the plurality of first microstructures 301 wherein one or more sides of the microstructure extend upward relative to the horizontal axis of the light control film 300 at any suitable angle, such as from about 5 to about 90 degrees. Moreover, each microstructure in the plurality of first microstructures 300 may have a left and right side, wherein such sides extend upwards relative to the horizontal axis of the light control film 300 by the same or different angle. The plurality of first microstructures 301 may also have any suitable dimensions. For example, when the plurality of first microstructures 301 are in the form of V-shaped grooves, each groove may in some embodiments be dimensioned such that it has at least one dimension ranging that is at least 5 to about 10 times the wavelength of light incident thereon, e.g., from a light source. In the case of incident visible light for example, the plurality of first microstructures 301 may have at least one dimension (e.g., depth, width, etc.) that is greater than or equal to about 2 microns, or greater than or equal to about 8 microns. Of course, a plurality of first microstructures 301 of other dimensions (e.g. larger or smaller than the foregoing range) may also be used, as desired. One example of suitable first microstructures that may be used in the light control film 300 is shown in FIG. 3B. As shown, in some embodiments each first microstructure 301 (not labeled) may exhibit a triangular cross sectional profile having a width (W) of about 50 microns and a height (H) of about 25 microns. As further shown in FIGS. 3A and 3C, such first microstructures 301 may be in the form of grooves extending across the first surface 201 of the light control film 300, such that an edge of one first microstructure 301 is in contact with or is directly adjacent an edge of at least one other first microstructure 301. As may be appreciated, the first microstructures 301 may therefore be arranged such that the period between adjacent first microstructures is substantially equivalent to their width (W), in this case about 50 microns. Of course, it should be understood that the period of the first microstructures 301 need not be equivalent to their width, and that any suitable period may be used. For example, when the first microstructures 301 are in the form of grooves, such grooves may be spaced apart so that the period between adjacent first microstructures 301 is larger than the width of each groove. Moreover, the first microstructures 301 need not be formed such that an edge of one first microstructure 301 contacts or is directly adjacent an edge of another first microstructure 301. Indeed as noted above, the first microstructures 301 may be spaced apart from one another such that a gap or space exists between adjacent edges of adjacent first microstructures 301.

FIG. 3C depicts scanning electron microscope (SEM) images of one example of a light control film including first microstructures consistent with FIGS. 3A and 3B. The upper left image of FIG. 3C is a top down SEM image of a light control film including a plurality of first microstructures 301 similar to those described above. The upper right image of FIG. 3C is an image of the diffusive pattern produced on the opposite side of the light control film 300. The bottom left and right images of FIG. 3C are cross sectional SEM images of the same light control film 300, and demonstrate how the plurality of first microstructures 301 are positioned such that an edge of one first microstructure is in contact with an edge of at least one other first microstructure.

Figure 3D:
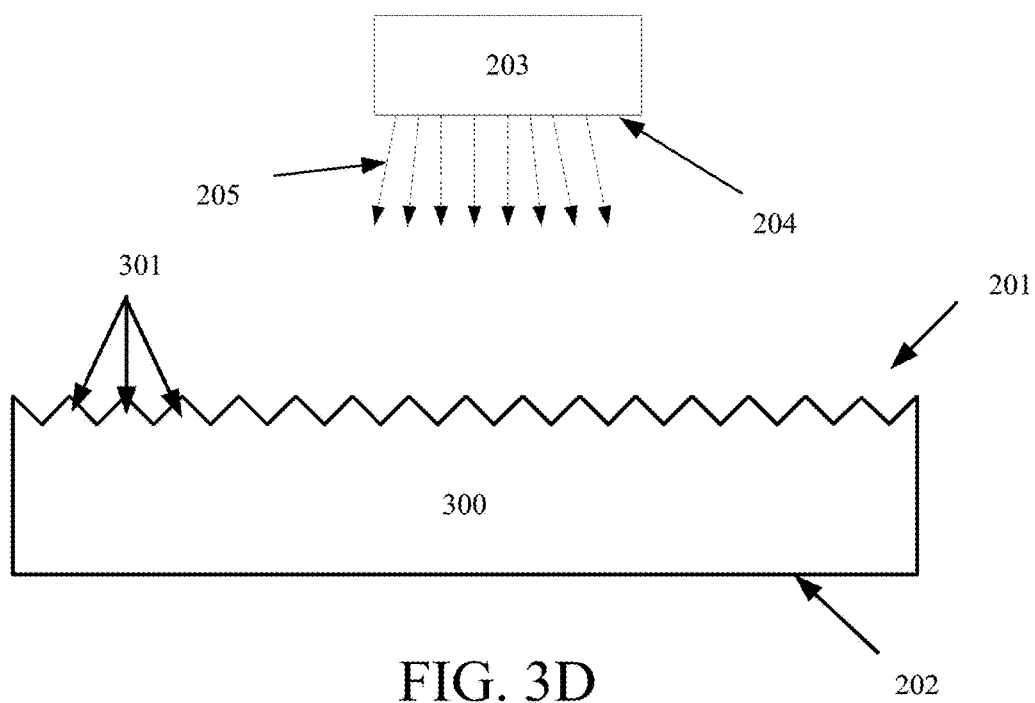
FIG. 3D depicts a lighting device including the light control film of FIG. 3A according to embodiments disclosed herein.

To test the performance of light control films similar to those described above, simulations were performed to evaluate the impact of the first microstructures 301 on the light distribution of a lighting device including a solid state light source (e.g., an solid state light source). The simulations assumed the use of a lighting device in which no light control film was used, and a lighting device in which the light control film shown in FIG. 3C was constructed and mounted proximate to a solid state light source, such that visible light emitted from the light source was incident on the first side 201 thereof. This concept is shown in FIG. 3D, which depicts the light control film 300 as being positioned relative to the light source 203, such that the first side 201 is oriented towards the light source 203. Notably in this orientation light 205 emitted from the light emitting surface 204 of the light source 203 is assumed to impinge on the first side 201, and more particularly, on the first microstructures 301.

Figure 3E:
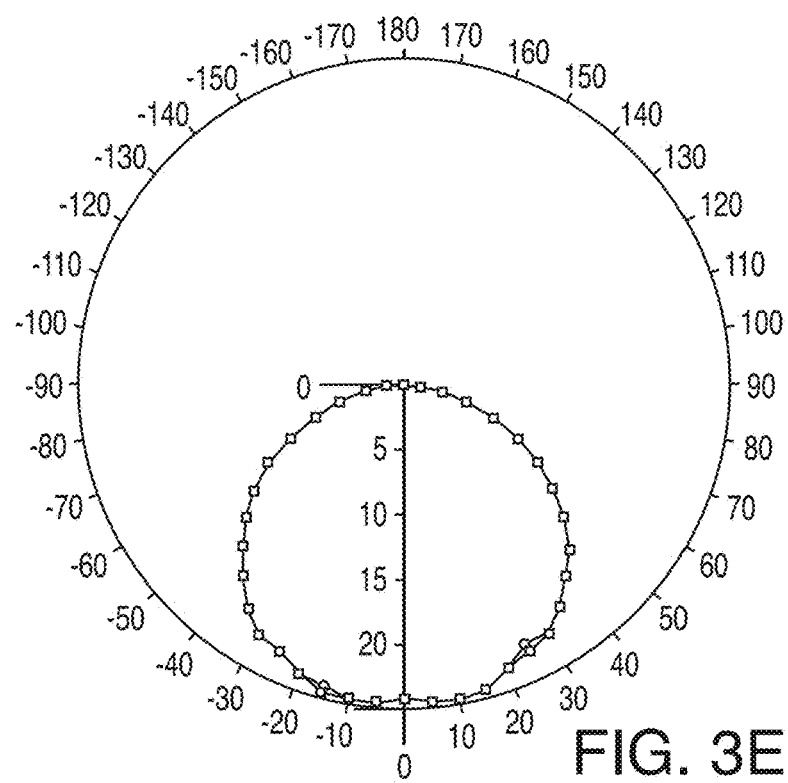
FIG. 3E depicts a light distribution produced by a lighting device without the light control film of FIG. 3A.
Figure 3F:
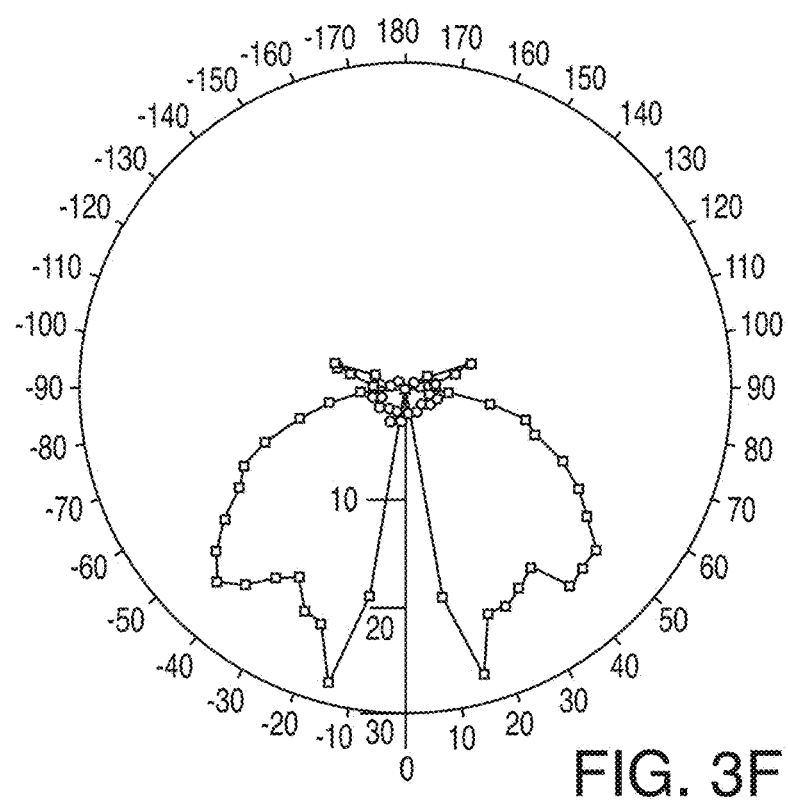
FIG. 3F depicts a light distribution produced by a lighting device including a light control film according to embodiments disclosed herein.
Figure 3G:
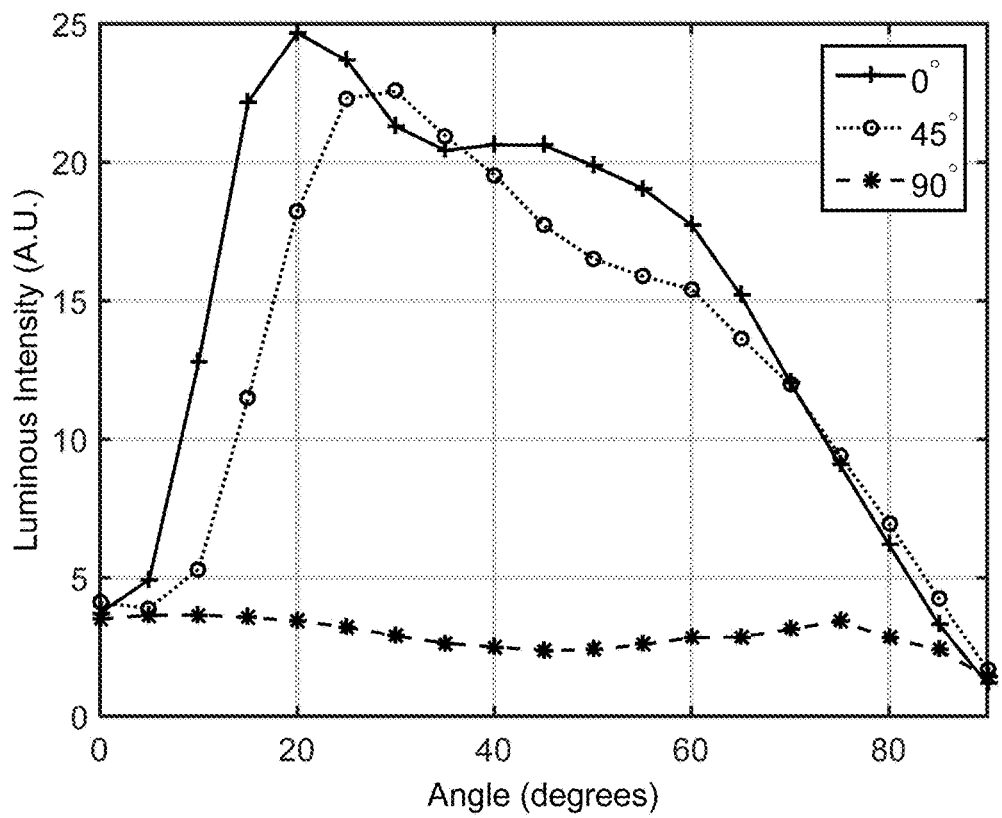
FIG. 3G. is a plot of luminous intensity vs. angle of light passing through a light control film according to embodiments disclosed herein.

FIG. 3E depicts the simulated light distribution of the lighting device that did not include a light control film consistent with FIG. 3C. In contrast, FIG. 3F depicts the simulated light distribution of the lighting device that included a light control film consistent with FIG. 3C. As shown in FIG. 3E, the simulation indicated that a lambertian distribution would result from the lighting device in the absence of the light control film. As shown in FIG. 3F, however, the simulation indicated that use of the light control film consistent with FIG. 3C would result in a batwing distribution of light downstream of the light control film. Notably, however, the simulation indicated that the batwing distribution was one dimensional. Moreover, the simulation results suggest that glare from these samples may be at an undesirably high level, e.g., due to larger amounts of light being output at higher angles (e.g., greater than 60 degrees). To confirm the results shown in FIG. 3F, a light control film consistent with FIG. 3C was arranged relative to a solid state light source in a manner consistent with FIG. 3D. Using a goniometer, optical measurements were then taken of the luminous intensity of the light in the field downstream of the light control film 300 at various measurement axes, namely at a 0 degree axis, a 45 degree axis, and a 90 degree axis. The result of those measurements is shown in FIG. 3G and confirms the simulation results of FIG. 3F. That is, the results in FIG. 3G confirm that the batwing distribution is one dimensional, with a maximum effect along a 0 degree measurement axis, and no effect along a 90 degree measurement axis.

Figure 4A:
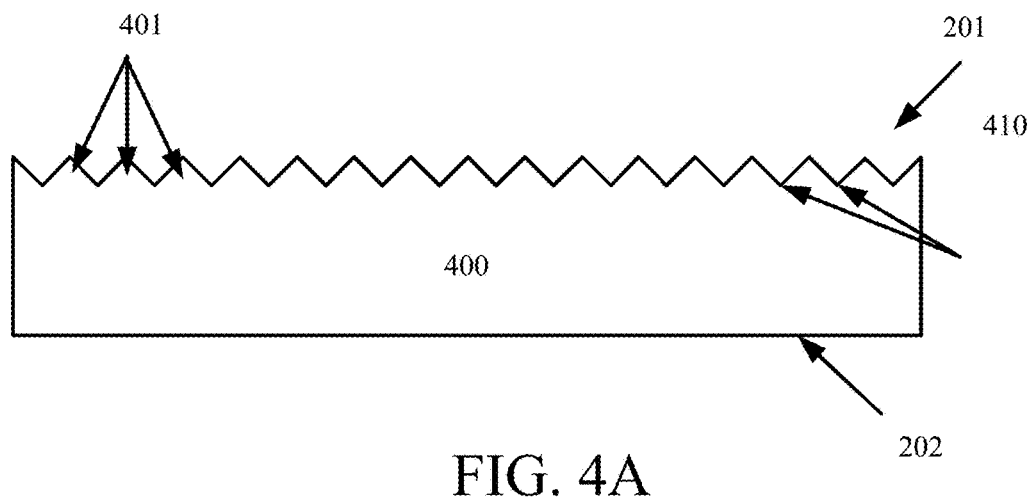
FIG. 4A illustrates a light control film including first microstructures according to embodiments disclosed herein.

Reference is now made to FIG. 4A, which depicts a cross sectional view of another example of a light control film including microstructures consistent with the present disclosure. Like the light control film 200, the light control film 400 includes a first side 201 and a second side 202. As shown, a plurality of first microstructures 401 is formed on the first side 201. In this embodiment, the plurality of first microstructures 401 are in the form of pyramid shaped structures. More particularly, the plurality of first microstructures 401 in this embodiment are in the form of four sided inverse pyramids, wherein the "point" of the pyramid is embossed or otherwise depressed within the first side 201. While the present disclosure focuses on embodiments in which inverse pyramids are used, it should be noted that raised pyramids (i.e., which extend from a surface of a light control film) may also be used and may exhibit the same or similar optical characteristics as the inverse pyramids. As one example of a suitable inverse pyramid that may be used as a first microstructure in the plurality of first microstructures 401, reference is made to FIGS. 4B and 4C, which provide top down and perspective views, respectively, of one of the first microstructures in the plurality of first microstructures 401. As shown in such figures, each first microstructure 401 in the plurality of first microstructures 401 in such embodiments have a roof 409 and a point 410. Consistent with the foregoing description and as further shown in FIG. 4A, the plurality of first microstructures 401 may be oriented point down, such that the point 410 is embossed or otherwise depressed within the first side 201. The roof 409 of each first microstructure in the plurality of first microstructures 401 may include a base having a length and width of any suitable dimension. For example, in some embodiments and as further shown in FIGS. 4B and 4C, each first microstructure in the plurality of first microstructures 401 may have a length X and a width Y, wherein the values of the length X and the width Y may be the same or different. For example, the length X and the width Y may range from greater than 0 to about 250 microns, from about 1 to about 150 microns, from about 10 to about 110 microns, from about 20 to about 75 microns, or from about 25 to about 50 microns. Of course, such ranges are for the sake of example only, and other length and width dimensions may be used and are envisioned by the present disclosure. In some embodiments, the length X and the width Y are the same or substantially the same, and range from about 90 to about 120 microns, from about 110 microns or from about 109 microns.

Figure 4B:
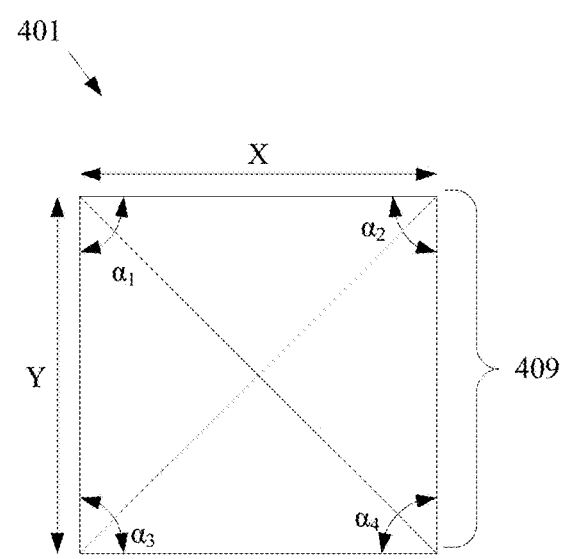
FIG. 4B is a top down view of a single first microstructure consistent with FIG. 4A.
Figure 4C:
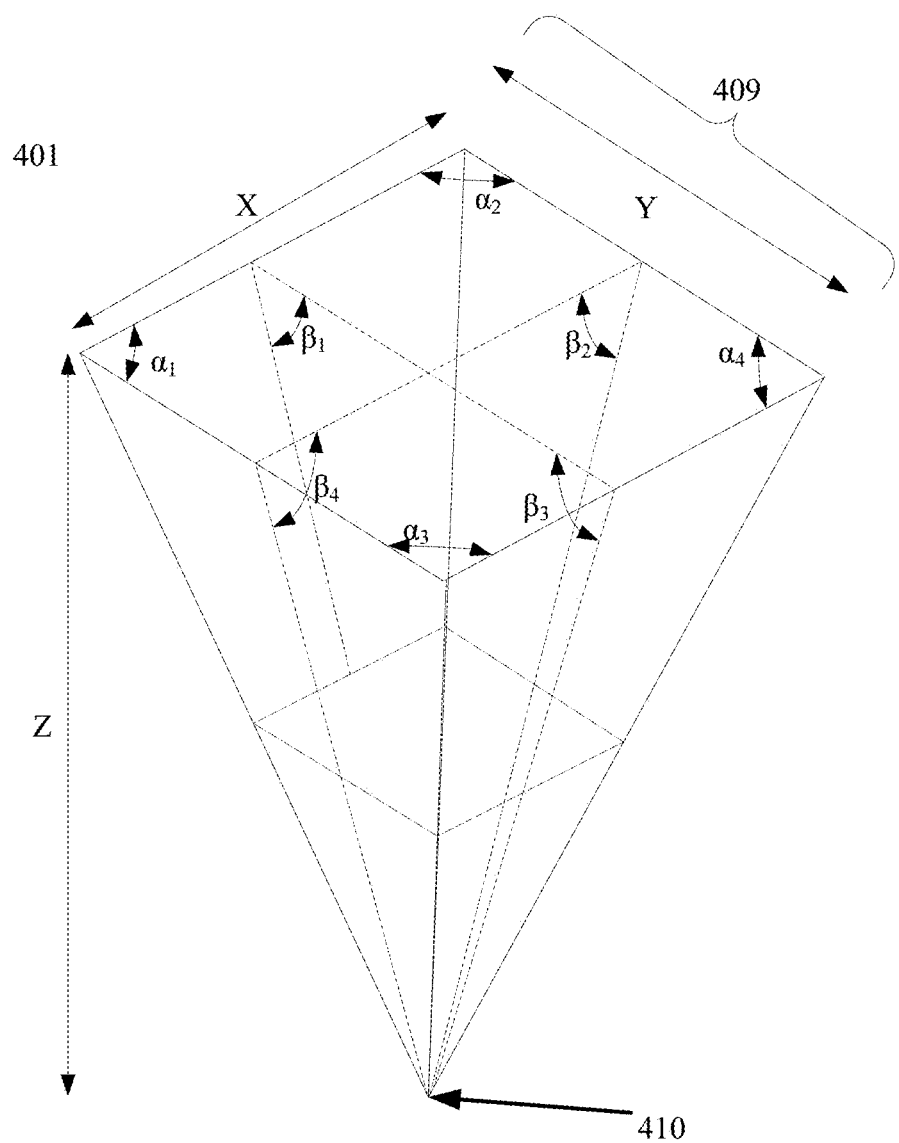
FIG. 4C is a perspective view of one example of first microstructures consistent with FIG. 4A.

As noted above, the first microstructures described herein may in some embodiments be embossed or otherwise embedded in a first surface (or side) of a light control film. In embodiments where such first microstructures are in the form of pyramids (or, more particularly, inverse pyramids), such pyramids may have a roof 409 as shown in FIGS. 4B and 4C. It should be understood that the roof 409 need not be a solid roof, i.e., a roof in which the area between its constituent segments is filled in with a material. Rather, in some embodiments, the roof 409 may be defined by its constituent segments, wherein the area between the constituent segments remains unfilled. Such a structure may be particularly useful the where first microstructures are in the form of depressions in the first side 201 of the light control film 400, wherein the depressions have an inverse pyramidal or other shape.

As further shown in FIG. 4C, each first microstructure in the plurality of first microstructures 401 may have a depth Z, wherein the depth Z may be any suitable dimension. For example, in some embodiments, the depth Z may range from greater than 0 to about 250 microns, from about 1 to about 150 microns, from about 1 to about 100 microns, from about 1 to about 65 microns, from about 1 to about 50 microns, or from about 1 to about 25 microns. Of course such ranges are for the sake of example only, and other depths may be used and are envisioned by the present disclosure. In some embodiments, the depth Z ranges from about 40 to about 70 microns, such as about 65 microns. Alternatively or additionally, in some embodiments, the depth Z may be calculated based on sidewall angles $\beta_1$-$\beta_4$, the length X, and the width Y, such that the pyramid shape is not truncated (e.g., is not in the form of a frustum).

As best shown in FIG. 4B, the geometry of the roof 409 may be defined by corner angles $\alpha_1$-$\alpha_4$, which in some embodiments are the same, and in some embodiments are different from one another. In FIG. 4B, the corner angles $\alpha_1$-$\alpha_4$ are each 90 degrees, such that the roof 409 has a square or rectangular shape. Of course the corner angles $\alpha_1$-$\alpha_4$ need not be the same, and may be adjusted to any desired value so as to correspondingly change the shape of the roof 409. In this regard, the corner angles $\alpha_1$-$\alpha_4$ may each range from greater than 0 to less than 180 degrees, such as from greater than or equal to about 10 degrees to less than or equal to about 165 degrees, greater than or equal to about 45 degrees to less than or equal to about 135 degrees, or from greater than or equal to about 70 degrees to less than or equal to about 120 degrees. As best shown in FIG. 4C, the geometry of each first microstructure in the plurality of first microstructures 401 may also be defined by the sidewall angles $\beta_1$-$\beta_4$. As can be seen, each sidewall angle $\beta_1$-$\beta_4$ represents the angle of one of the sidewalls (not labeled) of a first microstructure 401 relative to a corresponding segment of roof the 409. For the sake of example and ease of understanding, the sidewall angles $\beta_1$-$\beta_4$ are the same in FIG. 4C, but it should be understood that they may differ from one another. For example, the sidewall angles $\beta_1$-$\beta_4$ may each range from greater than or equal to about 35 degrees to less than or equal to about 70 degrees, such as from greater than or equal to about 40 degrees to less than or equal to about 65 degrees, greater than or equal to about 45 degrees to less than or equal to about 60 degrees, greater than or equal to about 50 degrees to less than or equal to about 55 degrees, or even about 50 degrees. In some embodiments, each of the sidewall angles $\beta_1$-$\beta_4$ is the same, and ranges from greater than or equal to about 40 degrees to less than or equal to about 60 degrees. As will be described later, the geometry of each of the plurality of first microstructures 401 and in particular the sidewall angles $\beta_1$-$\beta_4$ may have an impact on the light distribution produced by the light control film 400. As such, it may be desirable to control such parameters to attain a desired light distribution.

Figure 5:
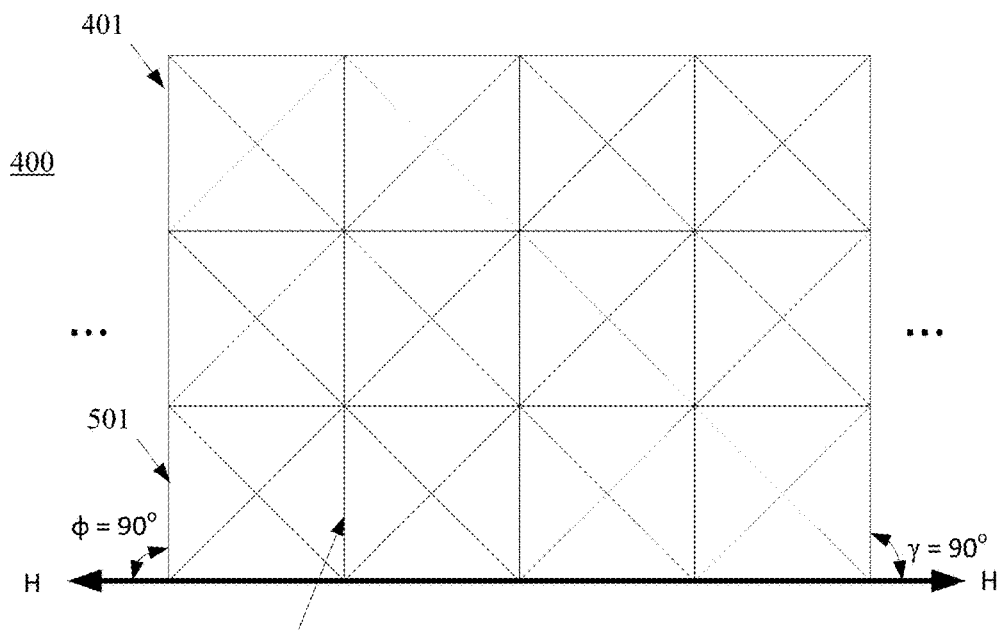
FIG. 5 is a top down view of an array of first microstructures relative to a horizontal axis of a light control film according to embodiments disclosed herein.
Figure 6A:
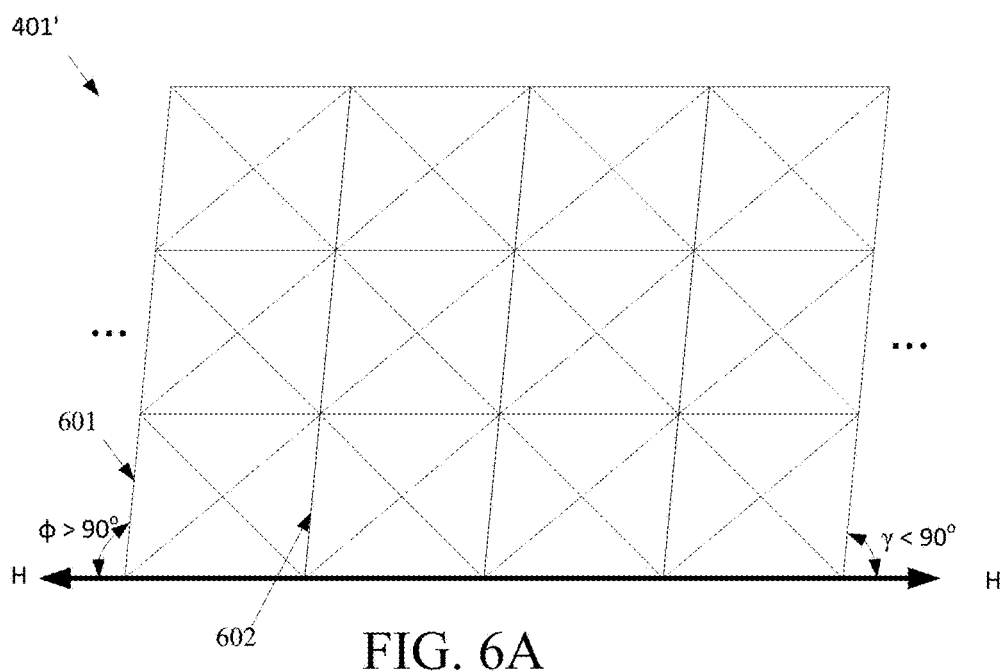
FIG. 6A is a top down view of another array of first microstructures relative to a horizontal axis of a light control film according to embodiments disclosed herein.

While FIGS. 4B and 4C focus on the geometry of one of the plurality of first microstructures 401, it should be understood that the plurality of first microstructures 401 may be formed on or integral with the first side 201, as generally shown in FIG. 4A. This concept is better shown in FIGS. 5, 6A, and 8B which provide top down and/or perspective views of the plurality of first microstructures 401. As shown in such figures, the plurality of first microstructures 401 may be formed on or integral with the first side 201. Moreover, in these example embodiments and as best shown in FIGS. 5 and 6A, the plurality of microstructures 401 are formed such that at least a portion of the roof 409 (not labeled in FIGS. 5 and 6A) of one of such microstructures contacts and/or is directly adjacent a portion of the roof 409 of at least one adjacent first microstructure 401. For example, in some embodiments, the plurality of first microstructures 401 may include a roof 409 with first, second, third, and fourth segments, wherein at least one of such segments contacts and/or is directly adjacent a segment of at least one adjacent first microstructure 401.

Figure 4D:
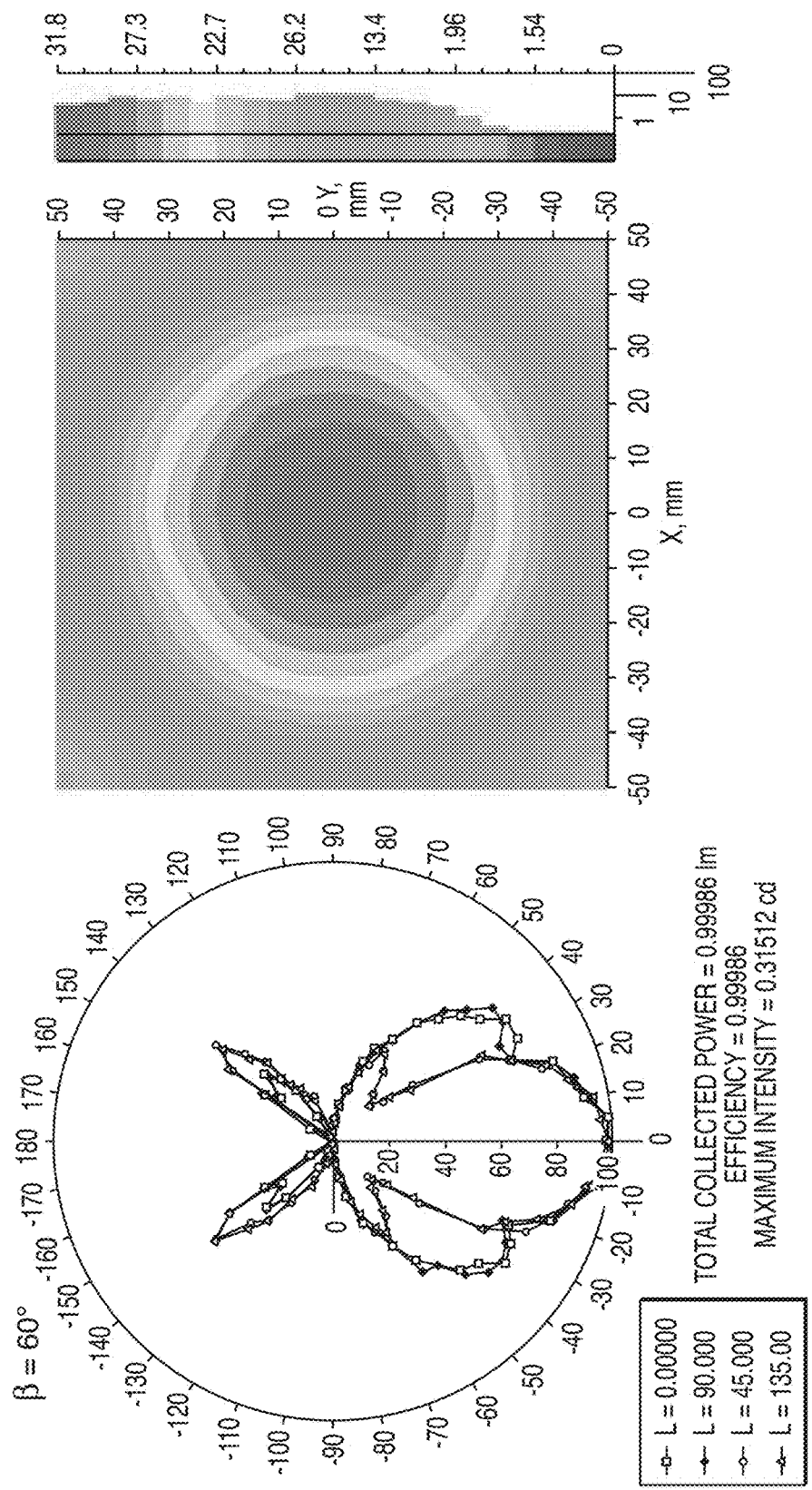
Figure 4F:
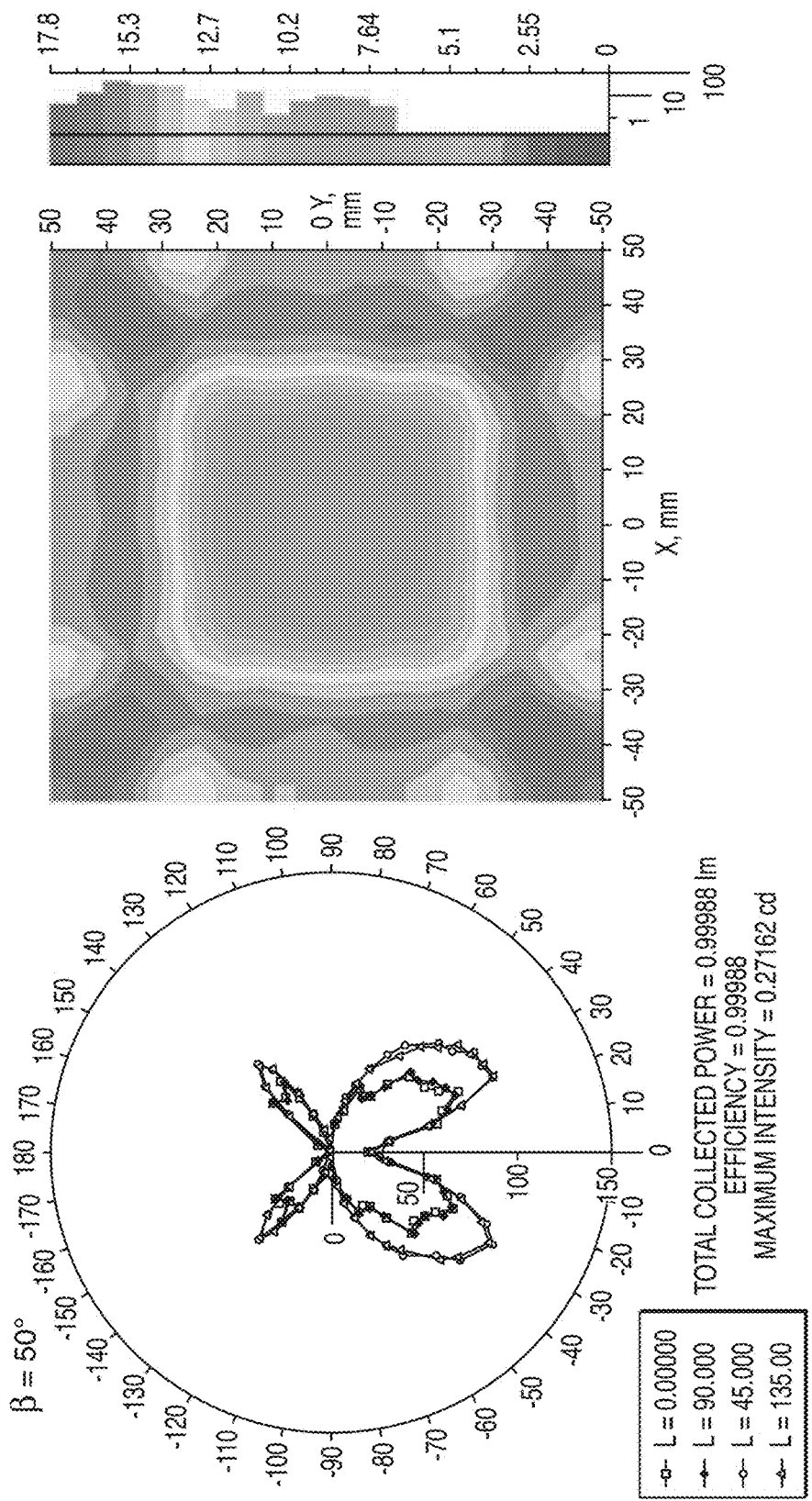
Figure 4G:
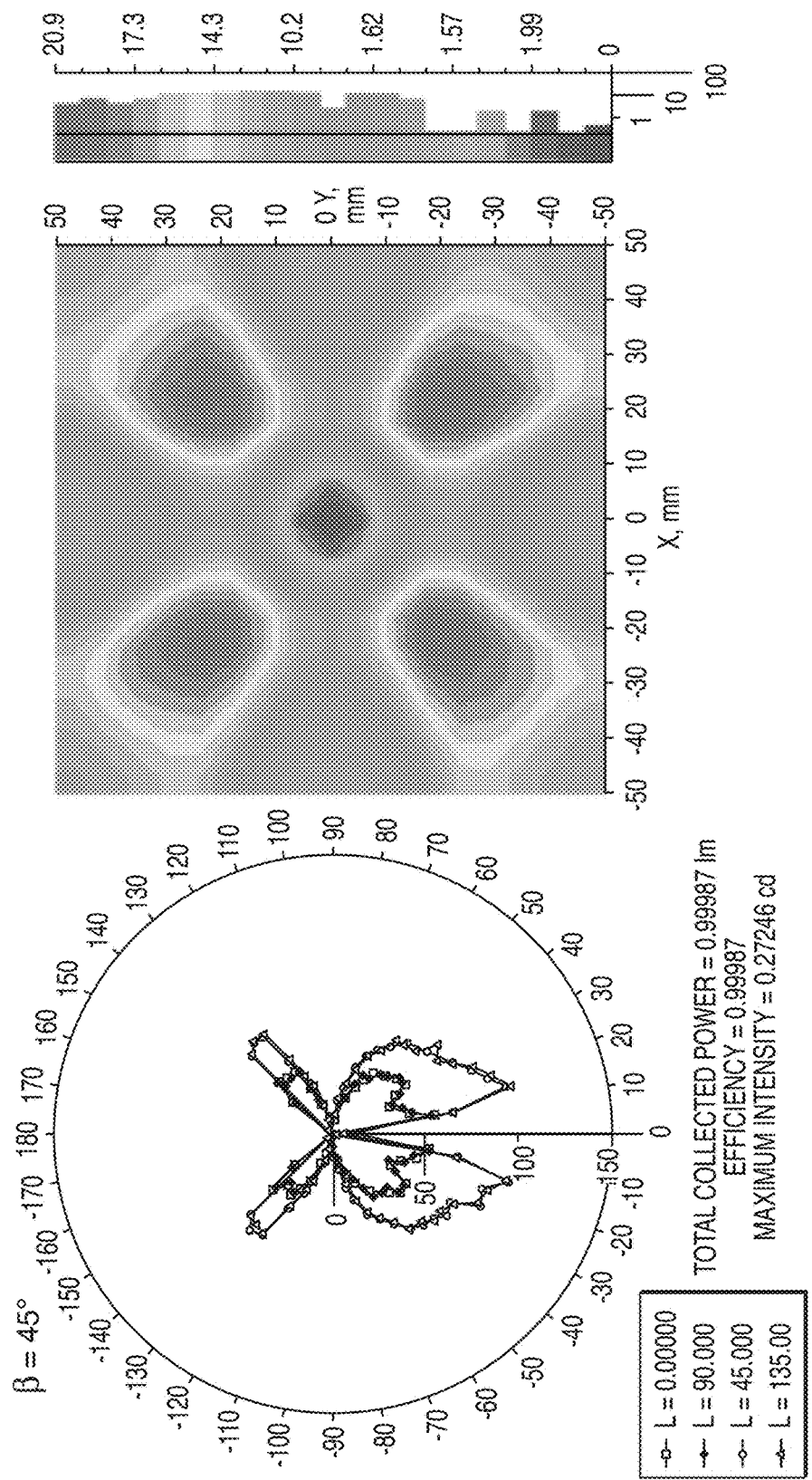

Returning to FIGS. 4A-4C, as noted above, the sidewall angles $\beta_1$-$\beta_4$ may have an impact on the distribution of light downstream of the light control film 400. To evaluate this concept, the optical performance of several hypothetical samples of light control films consistent with FIGS. 4A-4C was simulated, assuming an orientation and setup that is the same as shown in FIG. 3D. In such simulations, the corner angles $\alpha_1$-$\alpha_4$ were each the same and held constant at 90 degrees. In contrast, the sidewall angles $\beta_1$-$\beta_4$ of each sample were also the same, but such angles were varied between samples from 60 degrees to 40 degrees. The results of such simulations are shown in FIGS. 4D-4H. As shown in FIG. 4D, the simulated results for the sample of the light control film 400 including first microstructures 401 with sidewall angles $\beta_1$-$\beta_4$=60 degrees suggest that the sample of the light control film 400 would produce a light distribution that does not exhibit a batwing distribution, with the exception of a strong peak at about 60 degrees. However as shown in FIGS. 4E-4G, the simulated results for the samples of the light control film 400 including first microstructures 401 with sidewall angles $\beta_1$-$\beta_4$=55, 50, and 45 degrees, respectively, suggest that each of such films would produce a batwing light distribution. Notably and unlike the distribution of FIGS. 3F and 3G, the simulated batwing distribution of such samples was two dimensional. That is, the simulated batwing distribution was predicted for both a 45 degree and a 90 degree measurement axis. When the sidewall angles $\beta_1$-$\beta_4$ were reduced to 40 degrees, however, the simulated batwing distribution disappeared as shown in FIG. 4H. This suggests that for this particular geometry, batwing distributions may be obtained by controlling the sidewall angles $\beta_1$-$\beta_4$ to between about 45 to about 55 degrees, with a particularly strong batwing distribution expected when the sidewall angles $\beta_1$-$\beta_4$ are about 50 degrees. Of course, such samples are for the sake of example only, and it should be understood that by varying the geometry of first microstructures, batwing distributions may be attained with other sidewall and/or corner angles.

Turning now to FIG. 5, it is noted that in the foregoing samples it was assumed that the plurality of first microstructures 401 were each oriented such that two parallel segments, 501, 502, of the roof 409 were oriented substantially normal to a horizontal plane (H) of the light control film 400. More particularly and as further shown in FIG. 5, the orientation of each first microstructure in the plurality of first microstructures 401 may be defined by a first orientation angle $\phi$ and a second orientation angle $\gamma$. For the sake of clarity, the first orientation angle $\phi$ and the second orientation angle $\gamma$ are only shown in FIG. 5 for a leftmost and rightmost iteration of the first microstructure 401, but it should be understood that each first microstructure 401 may have an orientation defined by such parameters. In any case in the example of FIG. 5 (and the samples measured and described above in connection with FIGS. 4D-H), the first orientation angle $\phi$ and the second orientation angle $\gamma$ are each the same and are substantially 90 degrees, relative to the horizontal axis H of the light control film 400.

The orientation shown in FIG. 5 may be desirable in some instances, as it may enable the production of films that produce light distributions with a higher peak angle. It should be understood however that the light control films of the present disclosure are not limited to such orientations, and that the first microstructures described herein may be oriented differently. For example, the plurality of first microstructures 401 may be formed on or integral with the first side 201 of the light control film 400, and orientated such that one or more segments of the roof 409 is/are inclined or declined with respect to the horizontal plane (H) of the light control film 400. One example of this concept is shown in FIG. 6A, which provides a top down view of a light control film 400 including a plurality of first microstructures 401', wherein each of the first microstructures 401' has a first orientation angle $\phi$ that is greater than 90 degrees, and a second orientation angle $\gamma$ that is less than 90 degrees. As such, the embodiment shown in FIG. 6A may be understood to depict a light control film 400 in which first microstructures 401' were each oriented such that two parallel segments, 601, 602, of the roof 409 were oriented such that they are not substantially normal (i.e., not perpendicular) to a horizontal plane (H). As may also be appreciated, the corner angles $\alpha_1$-$\alpha_4$ are not 90 degrees in the embodiment of FIG. 6A, unlike the previously described embodiments.

Figure 6B:
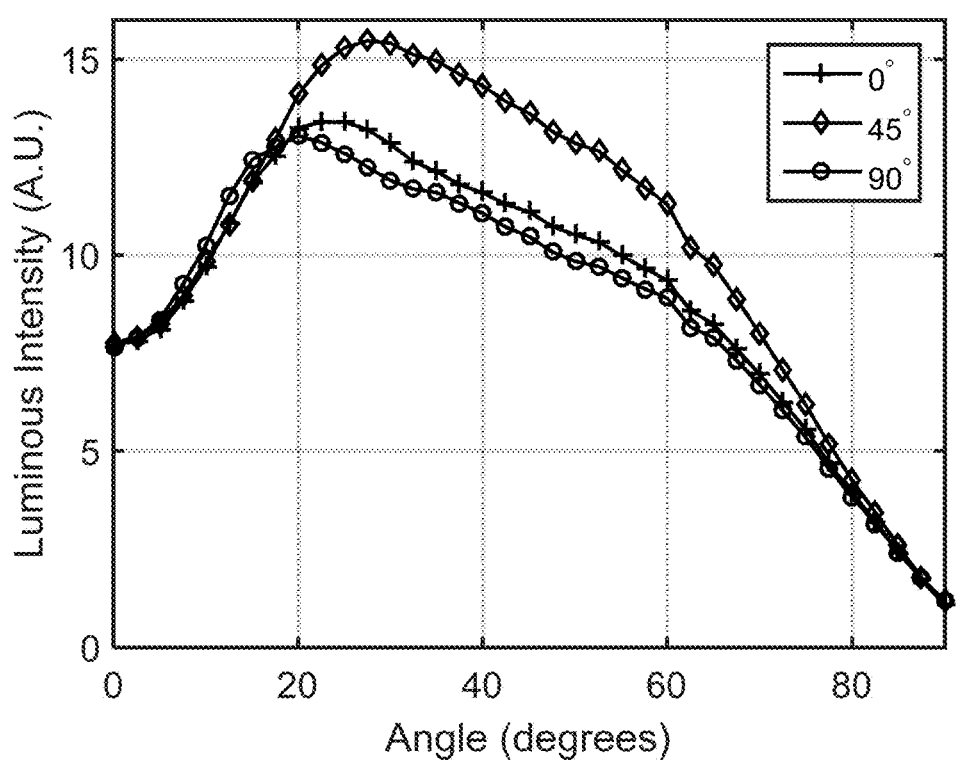
FIG. 6B a plot of luminous intensity vs. angle of light passing through a light control film consistent with FIGS. 4A and 6A.

With the foregoing in mind, using a goniometer optical measurements were taken of the light distribution produced by a lighting device including a film consistent with the foregoing description of FIG. 6A, wherein the film was oriented in the same manner as shown in FIG. 3D. The results of those measurements are shown in FIG. 6B. As shown, the film produced a light distribution with a two dimensional batwing distribution, e.g., observed along a 0 degree and 90 degree measurement axes. Like the sample films shown and described above in connection with FIGS. 3A-3G however, the results suggest that large amounts of light may be emitted from the lighting device at high angles, potentially resulting in undesirable glare.

As discussed above, various embodiments of the light control films described herein may produce a light distribution (e.g., a batwing distribution) that is relatively broad compared to a lambertian distribution. Although such light control films are useful, in some instances they may produce a light distribution that contains glare, e.g., the form of regions of highly intense light and/or in the form of light emitted at high angles (e.g., greater than or equal to about 50 or even about 60 degrees off center), relative to a light source.

With the foregoing in mind another aspect of the present disclosure relates to light control films that include glare control features. As will be described in detail below, such light control films may be configured to produce a relatively broad (e.g., a batwing) light distribution as compared to a lambertian distribution, while reducing, limiting, substantially preventing, or even eliminating glare. That is, such light control films may reduce, limit, substantially eliminate, or even eliminate light emitted at angles greater than or equal to about 60 degrees off center from a lighting device and/or a light source. Alternatively or additionally, such light control films may reduce, limit, or even eliminate regions of light within the downstream light distribution that are significantly more intense than adjacent regions within the light distribution.

Figure 7A:
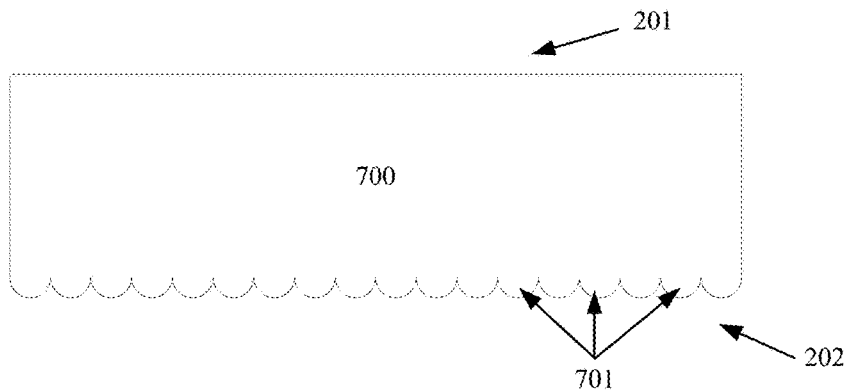
FIG. 7A depicts a light control film including second microstructures according to embodiments disclosed herein.

With the foregoing in mind, reference is made to FIG. 7A, which depicts one example of a light control film 700 including glare reduction features consistent with the present disclosure. As shown and like the previously described light control films, the light control film 700 includes a first side 201 and a second side 202. As will be described in detail later, first microstructures such as those described above may be formed on, embossed in, or otherwise embedded within the first side 201, as previously described. For the sake of clarity, however, such first microstructures are not shown in FIG. 7A. As further shown in FIG. 7A, the light control film 700 may include a plurality of second microstructures 701, which may be formed on, embossed in, or otherwise embedded within the second side 201. Without limitation, the plurality of second microstructures 701 are preferably formed on the second side 201, e.g., by a molding process, stamping process, lamination process, or other suitable process. It is noted that in the embodiment of FIG. 7A, the plurality of second microstructures 701 are depicted as being integral with the second side 202 of the light control film 700. In such configuration, it may be understood that the light control film 700 is configured as an integral structure, e.g. as a single film. As may be appreciated, such a structure may lack interfaces (e.g., between the second microstructures 701 and the body of the light control film 700), which may impact optical performance, such as the optical efficiency of the light control film 700. Of course it should be understood that the light control film 700 need not be formed as an integral structure, and that second microstructures may be provided on or in a second film that is bonded to the second side 202 or otherwise used in conjunction with the light control film 700.

As noted previously, the geometry of the second microstructures may vary considerably. Indeed, non-limiting examples of suitable second microstructures include partial spheres (e.g., hemispheres), partial ellipses, partial ovals, pillars, depressions, combinations thereof, and the like. In some embodiments the second microstructures 701 are in the form of partial spheres (hemispheres), partial ellipses, partial ovals, and/or lenslets, and are configured to impart glare reduction properties to the light control film 700.

Figure 7B:
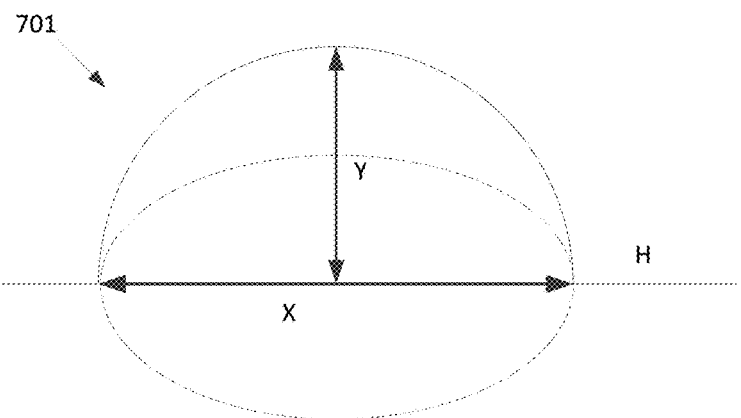
FIG. 7B illustrates a second microstructure according to embodiments disclosed herein.

FIG. 7B illustrates the geometry of one example of a second microstructure 401 consistent with the present disclosure. In the illustrated embodiment, the second microstructure 401 is in the form of a hemisphere that is disposed along a horizontal plane H of the second side 202 of the light control film 700. As shown, the second microstructure 401 may have a width X and a height Y. The width X may range, for example, from greater than 0 to about 150 microns, such as from greater than 0 to about 100 microns, greater than 0 to about 75 microns, or even greater than 0 to about 50 microns. In some embodiments, the width X of the second microstructure 401 is greater than or equal to about 20 to less than or equal to about 60 microns, such as about 50 microns. Of course such ranges are for the sake of example, and second microstructures 701 may have any suitable width.

Because the second microstructures 701 in the illustrated embodiment are hemispheres, the height Y is substantially one half of the width X. It should be understood, however, that the height Y need not be one half of the width X, or bear any relationship to the width X. Indeed like the width X, the height Y may range, for example from greater than 0 to about 150 microns, such as from greater than 0 to about 100 microns, greater than 0 to about 75 microns, or even greater than 0 to about 50 microns. In some embodiments, the width X of the second microstructures 401 is greater than or equal to about 20 to less than or equal to about 60 microns, such as about 50 microns. Of course such ranges are for the sake of example, and the second microstructures 701 may have any suitable width.

As may be appreciated, the embodiment of FIG. 7B depicts the second microstructure 701 as having an aspect ratio (the height Y:the width X) of 1:2. However it should be understood that the second microstructures 701 need not have an aspect ratio of 1:2, and that such microstructures may have any suitable aspect ratio. For example, second microstructures 701 may be configured such that they have an aspect ratio (the height Y:the width X) ranging from about 5:1 to about 1:5, such as about 4:1 to about 1:4, about 3:1 to about 1:3, about 2:1 to about 1:2, or even about 1:1. Without limitation, second microstructures 701 in some embodiments exhibit an aspect ratio of 1:2, 1:1, 2:1 or even 3:1. Of course, such aspect ratios are for the sake of example, and any suitable aspect ratio may be used. In embodiments where the aspect ratio of a second microstructure 701 is greater than 1:2, it may be understood that such microstructures are in the form of columns or pillars which extend from the second side 202 of the light control film 700. Moreover, while the present disclosure envisions embodiments in which the top of such pillars or columns is rounded (e.g., as shown in FIG. 7B), such a configuration is not required. Indeed as described above, the second microstructures 701 may exhibit a square, rectangular, or other geometric profiles, wherein a top of each microstructure may be flat or substantially flat. In such instances and like the embodiments described above, the aspect ratio (height:width) of such microstructures may be tailored to create pillars or columns as desired. To further illustrate this concept reference is made to FIG. 7C, which is a scanning electron microscope image of a plurality of second microstructures 701 consistent with the present disclosure. As shown, the plurality of second microstructures 701 extend from the second side 202 of the light control film 700 (not labeled). The plurality of second microstructures 701 in this embodiment are arranged in an offset pattern on the second side 202, such that first rows 702 of the plurality of second microstructures 701 are offset from adjacent second rows 703 of such microstructures. Of course, such a configuration is not necessary, and the plurality of second microstructures 701 may be arranged on the second side 202 in any suitable manner. For example, the plurality of second microstructures 701 may be arranged on the second side 202 in a grid like manner, wherein each second microstructure is substantially aligned with adjacent second microstructures 701. Alternatively or additionally, the plurality of second microstructures 701 may be present in a hexagonal arrangement.

Figure 7C:
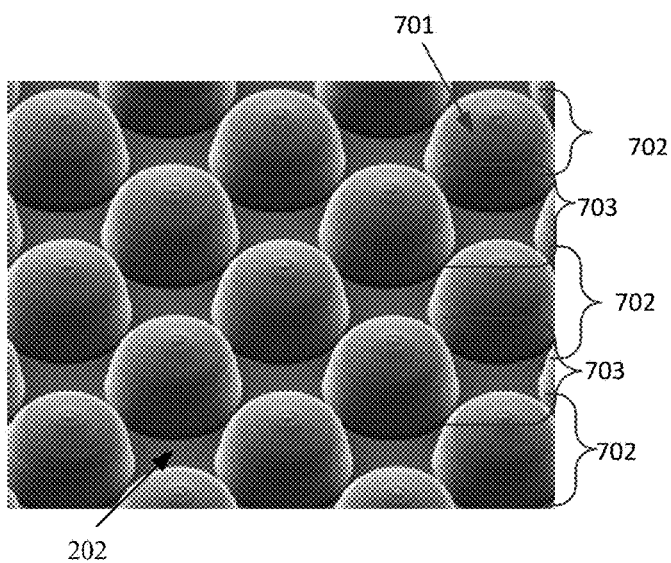
FIG. 7C is a scanning electron micrograph of a light control film including an array of second microstructures according to embodiments disclosed herein.

It is further noted that second microstructures 701 may be spaced in any suitable manner. Put in other terms, the period between adjacent second microstructures 701 may be set in any suitable manner. In some embodiments and as shown in FIG. 7A, the plurality of second microstructures 701 may be disposed on the second side 202 such that at least one side or edge of each second microstructure 701 touches or is directly adjacent at least one side of another second microstructure. In such instances, the period of such an array may be defined by the width (W) of the second microstructures 701 or, alternatively, a distance between corresponding points of two adjacent microstructures (e.g., a center to center distance). Alternatively and as shown in FIG. 7C, in some embodiments, the plurality of second microstructures 701 may be spaced apart from one another on the second side 202, e.g., by about 1, 10, 15, 20, 25, 50, or even 100 microns or more. In such embodiments, is may be understood that the period of such microstructures may be defined at least in part by the space between adjacent microstructures.

Figure 8A:
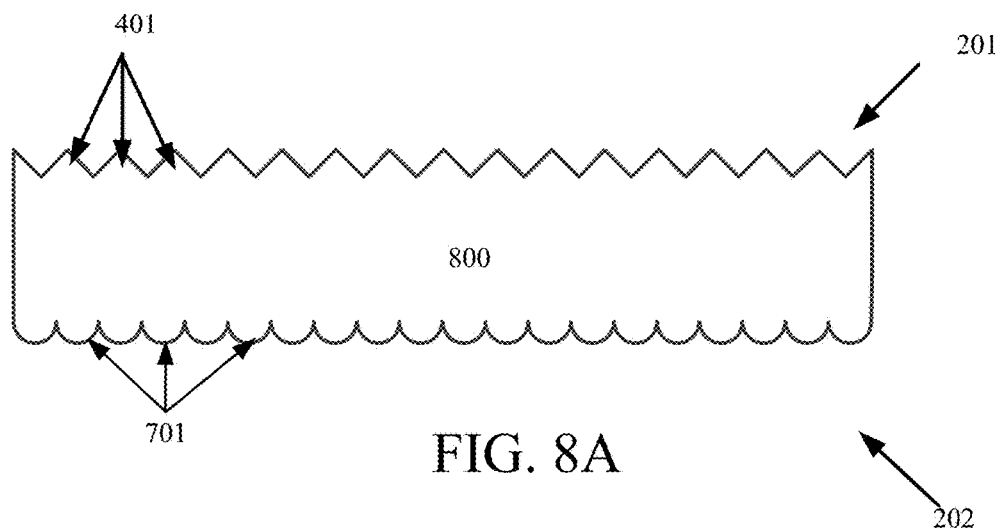
FIG. 8A depicts a light control film including both first and second microstructures according to embodiments disclosed herein.

Reference is now made to FIG. 8A, which depicts one example of a light control film including first and second microstructures consistent with the present disclosure. More specifically, FIG. 8A depicts a light control film 800 that includes first and second sides 201, 202, wherein a plurality of first microstructures 401 are present on the first side 201, and a plurality of second microstructures 701 are present on the second side 202. The nature and configuration of the plurality of first microstructures 401 and the plurality of second microstructures 701 has been described previously and therefore is not reiterated for the sake of brevity. For the sake of illustration, however, the present disclosure will proceed to describe the optical performance of an embodiment in which the light control film 800 includes a plurality of first microstructures 401 in the form of inverse pyramids as described above in connection with FIGS. 4A-4C, and a plurality of second microstructures 701 in the form of half spheres as described above in connection with FIGS. 7A-7C. One example of such a light control film 800 is depicted in FIG. 8B, which provides perspective views of the first side 201 and the second side 202 of the light control film 800. To evaluate the performance of such a film, optical simulations were run to calculate the expected light distribution from a lighting device in which a light control film consistent with FIG. 8A was used. The simulation assumed the use of a light control film 800 that was oriented in the same manner as shown in FIG. 3D, i.e., with the first side 201 oriented towards a solid state light source 203. In such a configuration, it may be appreciated that the plurality of first microstructures 401 are disposed proximate to the light source, whereas the plurality of second microstructures 701 are disposed distal from the light source. It is further noted that the simulation assumed that the inverse pyramids of the plurality of first microstructures 401 were oriented in the manner shown in FIG. 5, had a width X, a height Y, and a depth Z dimensions of 109 microns, 109 microns, and 65 microns, respectively, corner angles $\alpha_1$-$\alpha_4$=90 degrees, and sidewall angles $\beta_1$-$\beta_4$=50 degrees. Moreover, the simulation assumed that the half spheres used as the plurality of second microstructures 701 were arranged in the manner shown in FIG. 7C, had an X dimension (circumference) of about 60 microns and a Y dimension (height) of about 30 microns, and were arranged in a rectangular array with a spacing of about 67 microns between adjacent microstructures. The simulation results are presented in FIG. 8C, which depicts the light intensity vs. angle along several measurement axes (i.e., 0 degrees, 90 degrees, 45 degrees, and 135 degrees). The simulated results demonstrate that a "mild" batwing distribution (i.e., a batwing with relatively low peak intensity) is expected along the 0 and 90 degrees axes, but that a stronger batwing distribution (i.e., a batwing with relatively high peak intensity) is expected along the 45 and 135 degree measurement axes.

Figure 8D:
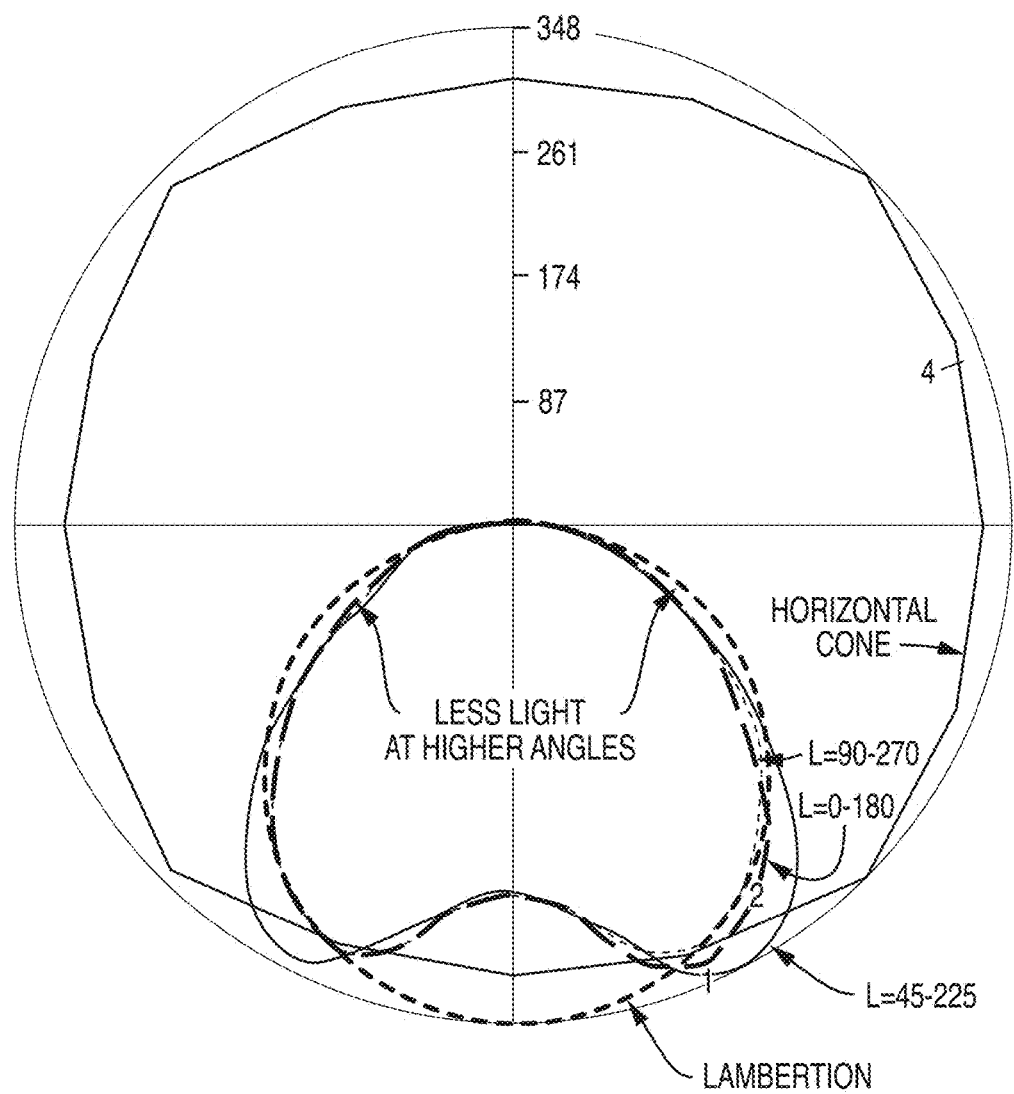
FIG. 8D depicts a measured light distribution produced by a lighting device including a light control film consistent with FIG. 8A.

To confirm the simulated results, a sample film having pluralities of first and second microstructures 401, 701 having substantially similar geometry as used in the simulation was created. Using a goniometer, optical measurements were taken of the sample film. The results of such measurements are presented in FIG. 8D. As shown, the optical measurements taken of the sample film substantially agreed with the simulated results presented in FIG. 8C. Moreover, it was confirmed with the sample film that less light was present at higher angles, signifying a reduction in glare relative to a bare solid state light source and, in some case, relative to a light control film including only first microstructures.

Another aspect of the present disclosure relates to lighting devices, systems and fixtures that include a light control film consistent with the present disclosure. For the sake of illustration, various embodiments will be described that relate to the use of the light control films in conjunction with certain lighting devices, specifically lighting devices including one or more solid state light sources. It should be understood that such description is for the sake of example, and the light control films described herein may be used in any type of lighting device, such as but not limited to a light engine, light module, linear fixture, a wall mount fixture (e.g., a sconce), ceiling mount fixture (e.g., a downlight), a floor mount fixture (e.g., an uplight), a shelving light, a flashlight, a spot light, a recessed downlight, an automobile lighting fixture, a lamp, combinations thereof, and the like. Indeed, the light control films may be used in any suitable lighting device so as to produce an output light having a desired light distribution, such as a batwing distribution as generally described above. Moreover, while the embodiments described below relate to the use of lighting devices that include light control films that produce a batwing light distribution, it should be understood that the light control films can be used to produce other off axis lighting distributions, as described above. For example, in some embodiments the light control films may be configured to produce a wall wash light distribution.

Figure 9A:
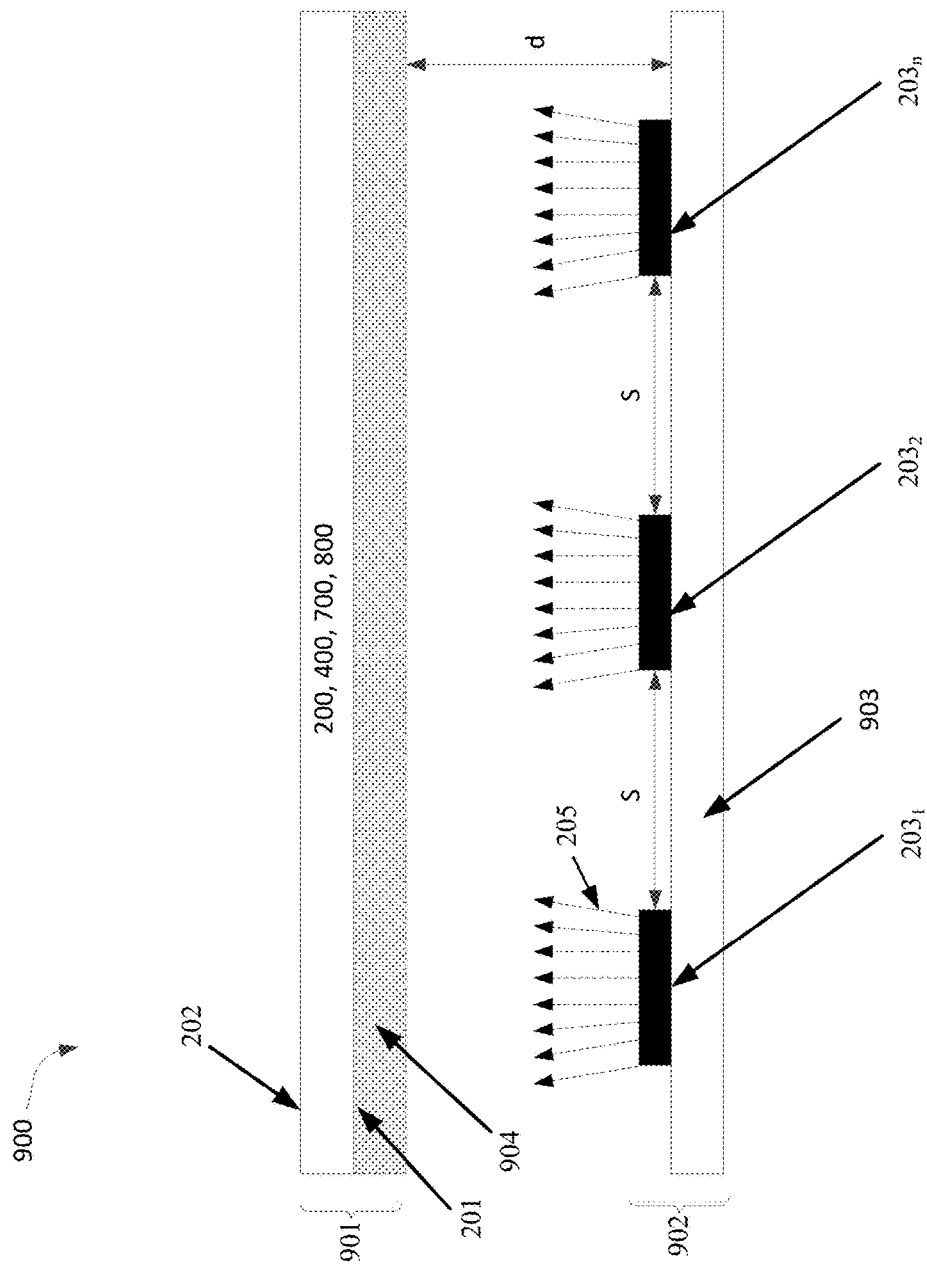
FIG. 9A depicts a lighting device including a light control film and an optional diffusion layer according to embodiments disclosed herein.

With the foregoing in mind, reference is now made to FIG. 9A, which depicts one example of a lighting device including a light control film consistent with the present disclosure. In FIG. 9A, a lighting device 900 includes an array 902, wherein the array 902 includes a circuit board 903 and a plurality of light sources $203_1$-$203_n$, with n being an integer greater than or equal to two. Otherwise the nature and configuration of the plurality of light sources $203_1$-$203n$ is the same as described above in connection with the light source 203, and therefore is not reiterated here in detail. In some embodiments, the plurality of light sources $203_1$-$203_n$ are solid state light sources.

As an initial matter, it is noted that for the sake of clarity FIG. 9A depicts the structure of the lighting device 900 in simplified form. It should be understood however that the lighting device 900 may include any number of other components that may be included in a lighting device, such as but not limited to a base, driving electronics, reflectors, a housing, one or more heat sinks, combinations thereof, and the like. With the foregoing in mind, the lighting device 900 further includes a light control structure 901. As shown, the light control structure 901 includes one or more light control films 200, 400, 700, 800, as described above. As illustrated, such light control films may be oriented such that a first side 201 thereof is oriented towards the array 902, and a second side 202 thereof is oriented away from the array 902. Of course and as will be described later, the orientation of the light control films 200, 400, 700, 800 may be changed, e.g., such the second surface 202 is oriented towards the array 902, and the first surface 201 is oriented away from the array 902. Notably in this embodiment, the light control film 200, 400, 700, 800 is configured to extend over a plurality of light sources $203_1$-$203_n$. In addition, in some embodiments, the light control structure 901 may further include an optional diffuser layer 904. Generally, the optional diffuser layer 904 may be configured to scatter light incident thereon. In this regard, the optional diffuser layer 904 may be in the form of a sheet or film that may be placed proximate to and/or coupled to light control film 200, 400, 700, 800. In the illustrated embodiment, the optional diffuser layer 904 is shown as coupled to the first side 201 of the light control film 200, 400, 700, 800, but other configurations are possible. For example, the optional diffuser layer 904 may be positioned proximate to and/or coupled to the second side 202 of the light control film 200, 400, 700, 800. More generally, the optional diffuser layer 904 may be present proximate to or distal from the array 902, relative to the light control film 200, 400, 700, 800. Any suitable type of diffuser may be used as the optional diffuser layer 904. Non-limiting examples of suitable diffusers that may be used as the optional diffuser layer 904 include volume diffusers (e.g., containing diffusing elements such as particles embedded within a bulk material), surface diffusers (e.g., where the surface(s) of the diffusers are roughened or otherwise configured to diffuse light, or a hybrid volume/surface diffuser (e.g., a combination of both a volume diffuser and a surface diffuser). Such diffusers may be proprietary and/or commercially available. Some examples of suitable diffuser layers that may be used include the KSH 95 film available from PLASKOLITE®, light shaping diffusers available from LUMINIT®, MAKROLON® Lumen XT available from BAYER® MaterialScience, and the ENVISION™ Diffuser film 3735-50 and 3735-60 available from 3M®.

In the embodiment of FIG. 9A, the optional diffuser layer 904 is adhered to the first side 201 of the light control film 200, 400, 700, 800. As such, the optional diffuser layer 904 may be understood to scatter light 205 incident thereon, e.g., from the plurality of light sources $203_1$-$203_n$. As may be appreciated, this may reduce the sensitivity (if any) of the light control films 200, 400, 700, 800 to the position of the plurality of light sources $203_1$-$203_n$. Use of the optional diffuser layer 904 in such a position may therefore open avenues to the use of various arrays of light sources $203_1$-$203_n$, including the use of aimed light sources.

Figure 9B:
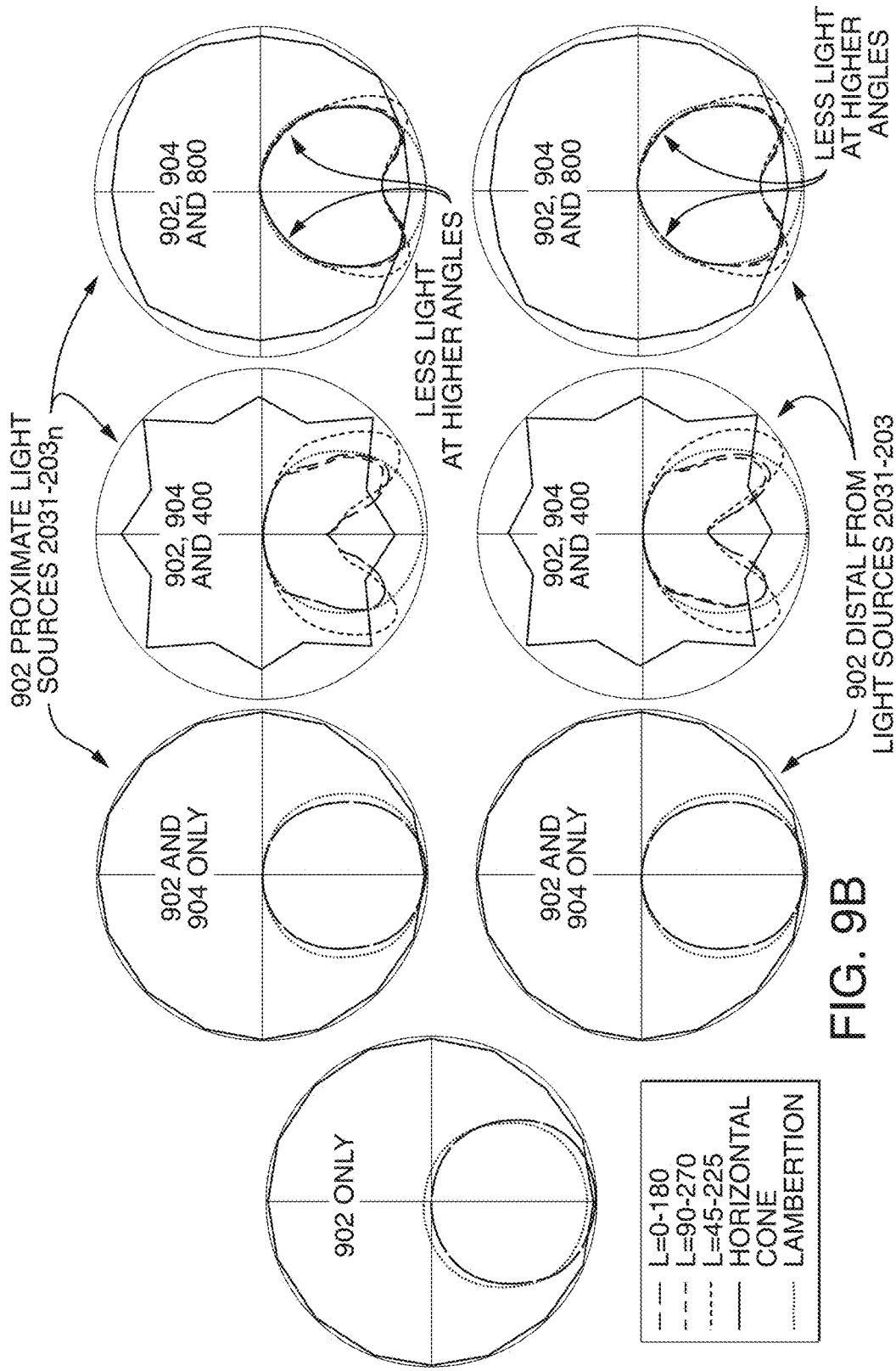
FIG. 9B depicts light distributions produced by lighting devices in various configurations according to embodiments disclosed herein.

Alternatively or in addition to reducing the sensitivity of the light control film 200, 400, 700, 800 to the position of the plurality of light sources $203_1$-$203_n$, the optional diffuser layer 904 also serves to obfuscate or otherwise conceal the plurality of light sources $203_1$-$203_n$ from a viewer of the lighting device 900. This feature may be achieved regardless of whether the optional diffuser layer 904 is positioned proximate to or distal from the plurality of light sources $203_1$-$203_n$, relative to the light control film 200, 400, 700, 800. To illustrate the impact of the optional diffuser layer 904 on light distribution, using a goniometer, optical measurements were taken of various samples in which a diffuser layer was used, either alone or in conjunction with a light control film consistent with the present disclosure. In such samples, the optional diffuser layer 904 was in the form of a volume diffuser and a surface diffuser, wherein one side of the diffuser layer was glossy and the other side of the diffuser layer was matte. Specifically, optical measurements were taken of: a lighting device including a light source 203 that emits light on a diffuser layer 904, and lighting devices including an array 902 consistent with the above description of FIG. 9A, an optical film 400 or 800 as described above in connection with FIGS. 4F, and 8D, with the matte surface of the optional diffuser layer 904 facing towards or away from the light source 203. In these embodiments and as shown in FIG. 9A, the light control structure 901 was oriented such light 205 from the emitting surface of the plurality of light sources $203_{1-n}$ was first incident on the optional diffuser layer 904. The results of such measurements are shown in FIG. 9B. As shown, the lighting device produced a substantially lambertian light distribution when the array 902 was used alone, or when the optional diffuser layer 904 was disposed above the array 902 in the absence of a light control film. As further shown, a batwing distribution was produced from the samples including the light control film 400, regardless of whether the matte surface of the optional diffuser layer 904 was oriented towards or away from the array 902. Likewise, a batwing distribution was produced from the samples including the light control film 800, regardless of whether the matte surface of the optional diffuser layer 904 was oriented towards or away from the array 902, relative to the light control film. This data suggests that the far field light distribution prompted by the light control films described herein may not be substantially affected by the use and orientation of the optional diffuser layer 904.

Figure 10A:
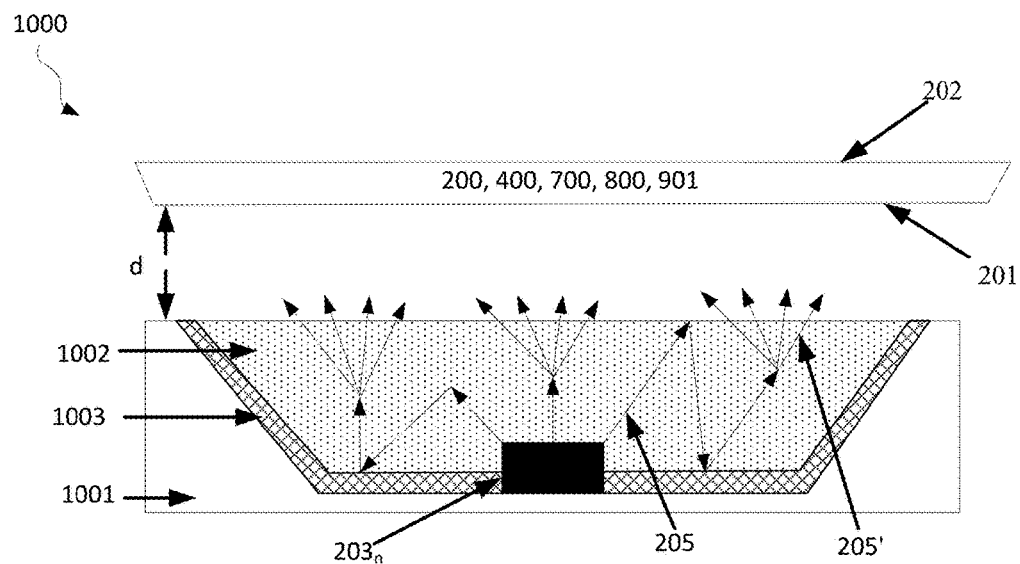
FIG. 10A depicts a lighting device including a reflector and a light control film according to embodiments disclosed herein.

Another example of a lighting device consistent with the present disclosure is shown in FIG. 10A. As shown, FIG. 10A depicts a lighting device 1000 in the form of a single solid state light source $203_n$. While only a single light source $203_n$ is shown in FIG. 10A, it should be understood that a plurality of such light sources may be used. In any case, it may be understood that FIG. 10A depicts one example in which lighting device 1000 is in the form of an solid state light source package and/or a solid state light source light engine. The lighting device 1000 further includes a frame 1001, an optional wavelength conversion layer 1002, and a reflector 1003. In this embodiment, the reflector 1003 is disposed about the light source $203_n$ and the optional wavelength conversion layer 1002, which is disposed in contact with a light emitting surface (not shown) of the light source $203_n$. As such, the lighting device 1000 may be understood to be in a chip level conversion configuration, i.e., where the optional wavelength conversion layer 1002 is in contact with the light source $203_n$. While such a configuration is useful, it should be understood that the lighting device may be configured in some other manner, e.g., in a remote phosphor conversion configuration (where the optional wavelength conversion layer 1002 is spaced some distance from the light source $203_n$), or in an unconverted configuration (i.e., where the optional wavelength conversion layer 1002 is not used). As further shown, the lighting device 1000 includes at least one light control film or light control structure consistent with the present disclosure, such as light control films 200, 400, 700, 800, or light control structure 901, described previously. The frame 1001 may be any frame that is suitable for supporting the light source $203_n$, the optional wavelength conversion layer 1002, and the reflector 1003. In some embodiments, the frame 1001 may be or include a circuit board containing electrical circuits, contacts, etc. to operate the light source $203_n$. Alternatively or additionally, the frame 1001 may be a support structure that provides mechanical support for other components in the lighting device 1000. The light source $203_n$ may be any suitable light source, as previously described. In some embodiments, the light source $203_n$ is one or more solid state light sources that are configured to emit primary light (e.g., light 205) from a light emitting surface thereof. Without limitation, light 205 in some embodiments is in the visible region of the electromagnetic spectrum, but the light source $203_n$ producing light in other regions may also be used. Regardless of its nature, the light source $203_n$ may emit light 205 from an emitting surface thereof (not labeled). The emitted light 205 may be emitted from the light source $203_n$ in any direction, but preferably towards the aperture (not labeled) of the lighting device 1000. It is noted that while FIG. 10A depicts an embodiment including a single light source $203_n$, such a configuration is not required. Indeed the present disclosure envisions embodiments in which the lighting device 1000 includes a plurality of light sources $203_n$, such as a plurality of solid state light sources as described above in connection with FIG. 9A.

In operation, light 205 emitted by the light source $203_n$ may impinge on the optional wavelength conversion layer 1002, which may be or include any suitable wavelength conversion material understood in the art (e.g., phosphors). In general, the optional wavelength conversion layer 1002 may be configured to convert at least a portion of incident light thereon to secondary light having a wavelength that differs from incident primary light, as generally understood in the art. As a result, a collective light output 205' may be produced, and may include a mixture of unconverted light 205 as well as light converted by the optional wavelength conversion material 1002. Alternatively, in embodiments where the optional wavelength conversion layer 1002 is not used, light 205 from the light source $203_n$ may be emitted without conversion.

In general, the reflector 1003 is configured to redirect light that may be emitted by the light source $203_n$, and/or which may be backscattered or reflected by the light control film 200, 400, 700, 800, or the light control structure 901 back towards the light source $203_n$. In any case, any suitable reflector may be used as the reflector 1003, provided that it can reflect a sufficient quantity of incident light. In some embodiments, an optional reflector is preferably configured to reflect greater than or equal to about 75%, 85%, 95%, or even 99% of light incident thereon. As further shown in FIG. 10A, the light control film 200, 400, 700, 800 or the light control structure 901 may be positioned some distance d away from the surface of the frame 1001, an edge of the reflector 1003, or a surface of the optional wavelength conversion material 1002. In such embodiments, the distance d may be any suitable distance, such as from 0 to about 50 millimeters (mm), from 0 to about 25 mm, from 0 to about 15 mm, from 0 to about 10 mm, or from about 0 to about 5 mm. In some embodiments, the distance d=0 mm, in which case it may be understood that the light control film 200, 400, 700, 800 or the light control structure 901, is disposed directly on the surface of the frame 1001, an edge of the reflector 1003, and/or a surface of the optional wavelength conversion layer 1002.

Figure 10B:
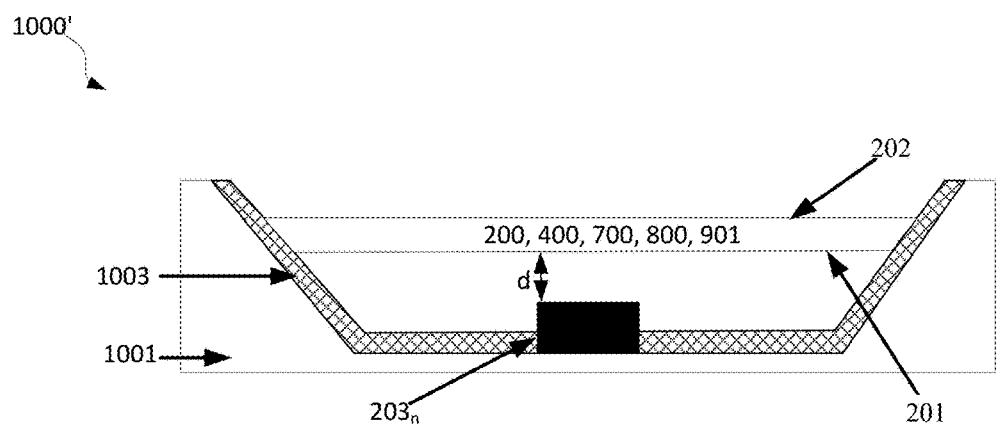
FIG. 10B depicts another lighting device including a reflector and a light control film according to embodiments disclosed herein.

In alternative embodiments, the lighting device 1000 of FIG. 10A may be configured such that the light control film 200, 400, 700, 800 or the light control structure 901 is disposed within the reflector 1003, e.g., in an solid state light source reflector cup package. One example of such a configuration is shown in FIG. 10B. As shown in this configuration, a lighting device 1000' includes a light control film 200, 400, 700, 800 or a light control structure 901 within a reflector 1003. Consistent with the foregoing description, the light control film 200, 400, 700, 800 or the light control structure 901 in this embodiment may be spaced a distance d from a light emitting surface of a light source $203_n$, wherein the distance d may be any suitable distance such as described above in connection with FIG. 10A. For example, the distance d in FIG. 10B may range from 0 to about 20 mm, such as from 0 to about 15 mm, and in some embodiments is 0, and in some embodiments is about 13 mm. It is noted that the distance d between the light control films and/or structures described herein and a light source may have an impact on the correlated color temperature of the light emitted from a lighting device consistent with the present disclosure. Indeed, in some embodiments, when the distance d is reduced below a threshold value, the correlated color temperature of the light emitted by a lighting device may be reduced. For example, in the absence of a light control film or structure, a lighting device consistent with FIG. 10A or 10B may be configured to output light with a first correlated color temperature. When a light control film or a light control structure is introduced and disposed at a distance d that is greater than a threshold distance from the emitting surface of the light source in such a lighting device, the correlated color temperature of the lighting device may be unaffected. However when light control film/structure is moved closer to the emitting surface of the light source (e.g., when the distance d is below the threshold distance), the correlated color temperature of the light output of the lighting device may change. For example, reducing the distance d below the threshold distance may in some embodiments cause an increase or decrease in the correlated color temperature of the light output from the lighting device. In some embodiments, the threshold distance is less than or equal to about 20 mm, such as less than or equal to about 15 mm, less than or equal to about 10 mm, less than or equal to about 5 mm, or less than or equal to about 1 mm. In some embodiments, the threshold distance is about 13 mm.

Many of the above described embodiments focus on lighting devices in which a light control film is disposed over a plurality of light sources, e.g., which may be present in a lighting array of the lighting device. While such embodiments are useful it should be understood that such a configuration is not required. Indeed for cost or other reasons, it may be desirable to arrange individual light control films over a single light source, such as a single solid state light source or solid state light source package. In this regard reference is made to FIG. 11, which depicts another example of a lighting device consistent with the present disclosure. As shown, a lighting device 1100 includes a lighting array 902', which may include a circuit board 903 including a plurality of light sources $203_n$. An optional wavelength conversion layer 1002 and/or an optional interface layer 1101 may be disposed on or around each light source $203_n$. Further, a light control film 400, 700, 800, or light control structure 901 may be arranged over each light source $203_n$ in the array 902'. That is, the lighting device 1100 may include a plurality of light control films and/or structures, wherein each light control film/structure is disposed over a one or a limited number of light sources $203_n$ in the array 902'.

The nature of the light control films/structures 400, 700, 800, 901, the optional wavelength conversion layer 1002, the plurality of light sources $203_n$, and the circuit board 902 is the same as described above in connection with other figures, and therefore is not reiterated for the sake of brevity. An optional interface layer 1101 may be placed between the plurality of light sources $203_n$ and the light control films 400, 700, 800, or the light control structure 901, as shown in FIG. 11. In general, the optional interface layer 1101 may function to improve extraction efficiency from the plurality of light sources $203_n$. Thus, for example, where the plurality of light sources $203_n$ are solid state light sources having a light emitting surface constructed from a material having a high refractive index (e.g., InGaN), an optional interference layer 1101 may be utilized to improve light extraction. Any suitable interface layer may be used, and the optional interface layer 1101 may be made of any suitable material. Non-limiting examples of suitable interface layers that may be used include those made from or including silicone, either alone or including phosphors such as ceramic and/or rare earth phosphors, sapphire, and glass. Of course, interface layers made from or including other materials may also be used. Without limitation, in some embodiments, the optional interface layer 1101 is used in conjunction with the optional wavelength conversion layer 1002. In such embodiments, it may be desirable to select materials for the optional wavelength conversion layer 1002 and the optional interference layer 1101 such that such layers have specific refractive indexes. In this regard, the optional wavelength conversion layer 1102 may have a first refractive index and the optional phosphor conversion layer 1002 may have a second refractive index, wherein the first and second refractive indices may each range from about 1 to about 3.5, but may differ by greater than or equal to about 0.1, about 0.3, or even about 0.5 of more. In some embodiments, the first and second refractive indexes differ by greater than or equal to about 0.5. In any case, the layers proximate the light emitting surface of the plurality of light sources $203_n$ may be indexed matched to the light emitting surface. For example, where the light emitting surface of the plurality of light sources $203_n$ is formed of InGaN having a refractive index of 2.6, the optional wavelength conversion layer 1002 may have an index of 2.6.

For the sake of illustration, FIG. 11 illustrates an embodiment in which the optional interface layer 1101 and the optional wavelength conversion layer 1002 are in the form of distinct layers. It should be understood that such illustration is for the sake of example, and such layers (or features thereof) may be combined in a single layer. For example, interface materials such as those noted above may in some embodiments be included in the optional wavelength conversion layer 1002, in which case a separate optional interface layer 1101 may be omitted.

Figure 12A:
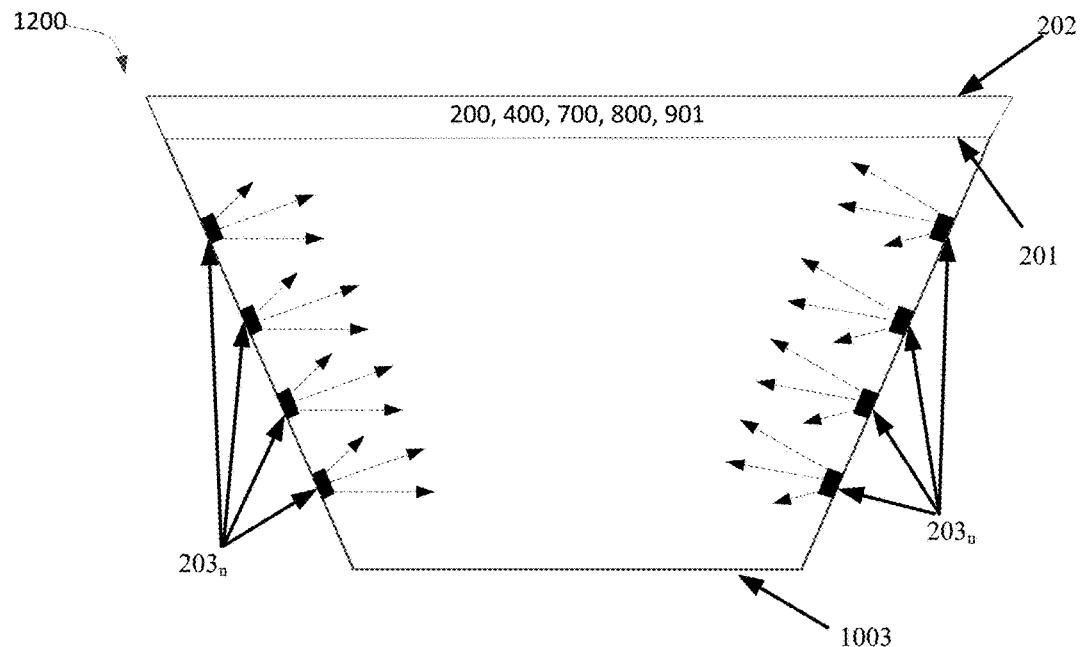
FIGS. 12A and 12B illustrate cross sectional and perspective views of another lighting device including a light control film according to embodiments disclosed herein.
Figure 12B:
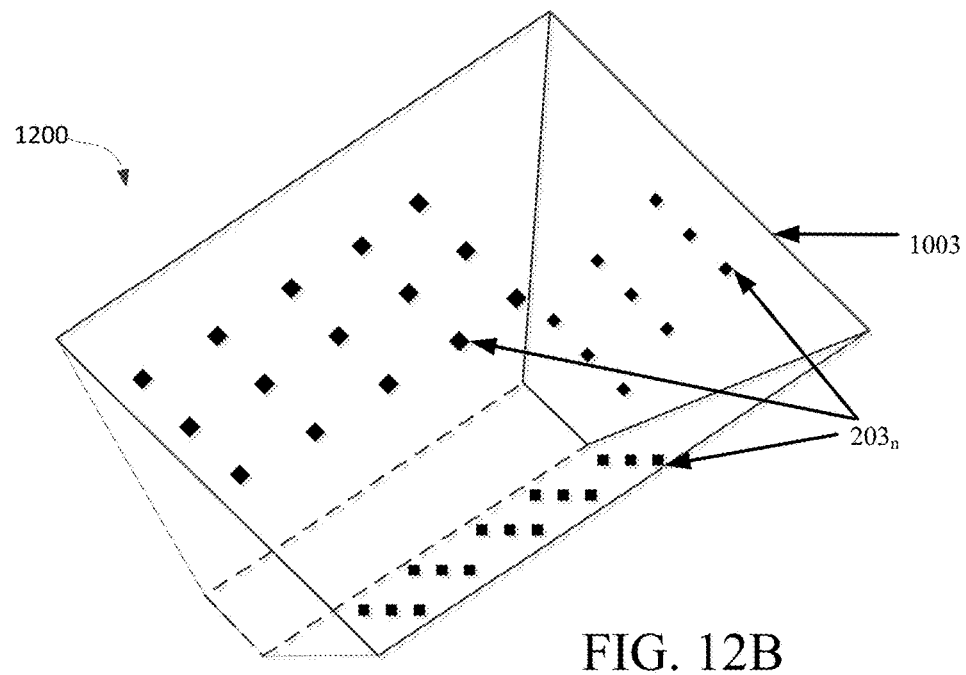

It is noted that in the above described examples, the light control films/structures of the present disclosure were installed or otherwise used in a lighting device including light sources that were oriented substantially normal to the light control film/structure. While such embodiments are useful, it should be understood that such a configuration is not required. Indeed the present disclosure envisions embodiments in which light sources that are not oriented substantially normal to a light control film/structure are used. For example, in some embodiments the light sources may be aimed sources such as one or a plurality of aimed solid state light sources, which may be used in conjunction with the light control films and structures herein. In this regard, FIGS. 12A and 12B depict cross sectional and top perspective views of a lighting device 1200 consistent with the present disclosure. As shown, the lighting device 1200 includes a plurality of aimed light sources 203$_n$. The nature and function of the plurality of aimed light sources 203$_n$ in FIGS. 12A and 12B is the same as described above in connection with the plurality of light sources 203$_n$ in connection with previous figures, and therefore is not reiterated. Such light sources may be disposed on a circuit board (not shown) or other support, so as to form an array. In some embodiments, the plurality of aimed light sources 203$_n$ in FIGS. 12A and 12B are in the form of an aimed array of solid state light sources. In the embodiment of FIG. 12A, the plurality of aimed light sources 203$_n$ are illustrated as being arranged on the sides of a reflector 1003, the nature and function of which is the same as previously described in connection with FIGS. 10A and 10B. In addition, the lighting device 1200 includes a light control film/structure 200, 400 700, 800, 901, which in the illustrated embodiment is disposed within an aperture (not labeled) of the reflector 1003. While such a configuration is useful, other configurations are of course possible. For example, the light control film/structure 200, 400 700, 800, 901 could be moved closed to a base (not labeled) of the reflector 1003, such that it is disposed closer to the plurality of aimed light sources 203$_n$, e.g., similar to the embodiment of FIG. 10B. Likewise, one or more optional diffuser layers, wavelength conversion layers, and interference layers may also be used, e.g., in substantially the same manner as described above in connection with other figures.

Notwithstanding that the numerical ranges and parameters setting forth the broad scope of the present disclosure are approximations, unless otherwise indicated the numerical values set forth in the specific examples are reported as precisely as possible. Any numerical value, however, inherently contains certain errors necessarily resulting from the standard deviation found in their respective testing measurements.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. As used herein, the terms "substantially" and "about" when used in connection with an amount or range mean plus or minus 5% of the stated amount and/or the endpoints of the range. When used in connection with the alignment of an element with respect to an axis or a plane, the terms "substantially" and "about" refer to an element that is aligned with the indicated axis or plane to within +/−5 degrees.

Throughout the entirety of the present disclosure, use of the articles "a" and/or "an" and/or "the" to modify a noun may be understood to be used for convenience and to include one, or more than one, of the modified noun, unless otherwise specifically stated. Thus, as used herein singular expressions such as "a," "an," and "the" are not limited to their singular form, and are intended to cover the plural forms as well unless the context clearly indicates otherwise.

The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A light control film, comprising:
    a single layer of light transparent material comprising a first side and a second side; and
    a plurality of first microstructures formed on the first side;
    wherein the light control film is configured to receive incident light from a light source on the first side and to produce an off-axis light distribution in a light field downstream of the second side
    wherein the plurality of first microstructures comprise multiple sided pyramids;
    wherein the multiple sided pyramids are each inverse pyramids having a point embedded into the first side of the single layer of light transparent material and a roof comprising a plurality of segments;
    wherein the inverse pyramids each comprise first, second, third, and fourth sides, wherein each roof has a quadrilateral shape defined by first, second, third, and fourth segments, and wherein a geometry of the inverse pyramids is defined at least in part by a first, second, third, and fourth sidewall angles $\beta 1$-$\beta 4$, the first sidewall angle $\beta 1$ defined between the first side and the first segment, the second sidewall angle $\beta 2$ defined between the second side and the second segment, the third sidewall angle $\beta 3$ defined between the third side and the third segment, and the fourth sidewall angle $\beta 4$ defined between the fourth side and the fourth segment, and wherein the first, second, third, and fourth sidewall angles $\beta 1$-$\beta 4$ are each about 50 degrees; and
    further comprising a plurality of second microstructures on the second side, the second microstructures configured to reduce glare in the off axis light distribution, wherein the plurality of second microstructures comprises hemispheres.

2. The light control film of claim 1, wherein each roof has a quadrilateral shape defined by first, second, third, and fourth segments, wherein at least two of the first, second, third, and fourth segments are parallel to one another, and wherein the parallel segments are oriented relative to a horizontal plane of the light control film by a first orientation angle and a second orientation angle, wherein the first orientation angle and the second orientation angle are each 90 degrees relative to the horizontal plane.

3. The light control film of claim 2, wherein the first orientation angle is less than 90 degrees relative to the horizontal plane, and the second orientation angle is greater than 90 degrees relative to the horizontal plane.

4. The light control films of claim 1, wherein the inverse pyramids each comprise first, second, third, and fourth sides, wherein each roof has a quadrilateral shape defined by first, second, third, and fourth segments, and wherein a geometry of the inverse pyramids is defined at least in part by a first, second, third, and fourth corner angles $\alpha 1$-$\alpha 4$, the first corner angle $\alpha 1$ defined between the first segment and the second segment, the second corner angle $\alpha 2$ defined between the second segment and the third segment, the third corner angle $\alpha 3$ defined between the third segment and the fourth segment, and the fourth corner angle $\alpha 4$ defined between the first segment and the fourth segment, and the first, second, third, and fourth corner angles α1-α4 are each in the range of about 70 to about 120 degrees.

5. The light control film of claim 1, wherein the plurality of second microstructures each comprise a height, a width, and a height:width aspect ratio, and the height:width aspect ratio is about 1:2.

6. A lighting device, comprising:
at least one solid-state light source configured to emit light; and
a light control film, comprising:
   a single layer of light transparent material having a first side and a second side; and
   a plurality of first microstructures formed on the first side;
wherein the light control film is configured to receive incident light emitted by the light source on the first side and to produce an off-axis light distribution in a light field downstream of the second side;
wherein the plurality of first microstructures comprise multiple sided pyramids;
wherein the multiple sided pyramids are each inverse pyramids having a point embedded into the first side of the single layer of light transparent material and a roof comprising a plurality of segments;
wherein the inverse pyramids each comprise first, second, third, and fourth sides, wherein each roof has a quadrilateral shape defined by first, second, third, and fourth segments, and wherein a geometry of the inverse pyramids is defined at least in part by a first, second, third, and fourth sidewall angles β1-β4, the first sidewall angle β1 defined between the first side and the first segment, the second sidewall angle β2 defined between the second side and the second segment, the third sidewall angle β3 defined between the third side and the third segment, and the fourth sidewall angle β4 defined between the fourth side and the fourth segment, and wherein the first, second, third, and fourth sidewall angles β1-β4 are each about 50 degrees; and
further comprising a plurality of second microstructures on the second side, the second microstructures configured to reduce glare in the off axis light distribution, wherein the plurality of second microstructures comprises hemispheres.

7. The lighting device of claim 6, wherein each roof has a quadrilateral shape defined by first, second, third, and fourth segments, wherein at least two of the first, second, third, and fourth segments are parallel to one another, and wherein the parallel segments are oriented relative to a horizontal plane of the light control film by a first orientation angle and a second orientation angle, wherein the first orientation angle and the second orientation angle are each 90 degrees relative to the horizontal plane.

8. The lighting device of claim 7, wherein the first orientation angle is less than 90 degrees relative to the horizontal plane, and the second orientation angle is greater than 90 degrees relative to the horizontal plane.

9. The lighting device of claim 6, wherein the inverse pyramids each comprise first, second, third, and fourth sides, wherein each roof has a quadrilateral shape defined by first, second, third, and fourth segments, and wherein a geometry of the inverse pyramids is defined at least in part by a first, second, third, and fourth corner angles α1-α4, the first corner angle α1 defined between the first segment and the second segment, the second corner angle α2 defined between the second segment and the third segment, the third corner angle α3 defined between the third segment and the fourth segment, and the fourth corner angle α4 defined between the first segment and the fourth segment, and the first, second, third, and fourth corner angles α1-α4 are each in the range of about 70 to about 120 degrees.

10. The lighting device of claim 6, wherein the plurality of second microstructures each comprise a height, a width, and a height:width aspect ratio, and the height:width aspect ratio is about 1:2.

* * * * *